US012549791B2

(12) United States Patent
Newman et al.

(10) Patent No.: US 12,549,791 B2
(45) Date of Patent: Feb. 10, 2026

(54) REDUCING NETWORK BANDWIDTH CONSUMPTION OF REAL-TIME BROADCASTS USING GENERICALLY ENCODED MEDIA OBJECTS

(71) Applicant: VIASAT, INC., Carlsbad, CA (US)

(72) Inventors: Daniel M. Newman, Littleton, MA (US); Mark D. Dankberg, Encinitas, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/640,786

(22) Filed: Apr. 19, 2024

(65) Prior Publication Data
US 2024/0388752 A1 Nov. 21, 2024

Related U.S. Application Data

(63) Continuation of application No. PCT/US2022/046483, filed on Oct. 12, 2022.
(Continued)

(51) Int. Cl.
*H04N 21/25* (2011.01)
*H04N 21/2187* (2011.01)
(Continued)

(52) U.S. Cl.
CPC ... *H04N 21/25875* (2013.01); *H04N 21/2187* (2013.01); *H04N 21/23106* (2013.01);
(Continued)

(58) Field of Classification Search
CPC ......... H04N 21/25875; H04N 21/2187; H04N 21/23106; H04N 21/2343; H04N 21/2393;
(Continued)

(56) References Cited

U.S. PATENT DOCUMENTS 6,769,127 B1 * 7/2004 Bonomi ............. H04N 21/2221
348/E7.071
7,698,724 B1 * 4/2010 Day ................... H04N 21/2665
725/87
(Continued)

FOREIGN PATENT DOCUMENTS

| WO | 2007028245 A1 | 3/2007 |
| WO | 2010083214 A2 | 7/2010 |

OTHER PUBLICATIONS

International Search Report and Written Opinion, for PCT/US2022/046483, dated Jan. 20, 2023, in 15 pages.
(Continued)

*Primary Examiner* — Timothy R Newlin
(74) *Attorney, Agent, or Firm* — Chang & Hale LLP

(57) ABSTRACT

Described herein are ways to reduce bandwidth use for real-time broadcasts between an Internet Service Provider (ISP) and its subscribers by re-encoding audiovisual data streams to have a generic encoding that can be viewed by subscribers of different content providers. A system can determine that a plurality of subscribers is watching the same live event and can multicast the generic encoding of the live event to the plurality of subscribers, even where individual subscribers stream the live event from different content providers. This can eliminate the need for streaming multiple versions of the same live event from different content providers to subscribers. The systems can generically encode an audiovisual data stream of a live event to generate a single audiovisual data stream for the live event that is multicast to subscribers watching the same live event.

21 Claims, 18 Drawing Sheets

Related U.S. Application Data

(60) Provisional application No. 63/257,558, filed on Oct. 19, 2021.

(51) Int. Cl.
  *H04N 21/231* (2011.01)
  *H04N 21/2343* (2011.01)
  *H04N 21/239* (2011.01)
  *H04N 21/258* (2011.01)
  *H04N 21/6405* (2011.01)
  *H04N 21/81* (2011.01)

(52) U.S. Cl.
  CPC ..... *H04N 21/2343* (2013.01); *H04N 21/2393* (2013.01); *H04N 21/6405* (2013.01); *H04N 21/812* (2013.01)

(58) Field of Classification Search
  CPC ............ H04N 21/6405; H04N 21/812; H04N 21/23418; H04N 21/26616; H04N 21/2665; H04N 21/6581
  See application file for complete search history.

(56) References Cited

U.S. PATENT DOCUMENTS

| | | | | |
|---|---|---|---|---|
| 8,295,200 | B2* | 10/2012 | Overtoom | H04N 7/17318 |
| | | | | 370/254 |
| 9,549,152 | B1* | 1/2017 | Nayyar | H04L 65/403 |
| 10,860,860 | B1* | 12/2020 | Huynh | G06F 16/739 |
| 2004/0181579 | A1* | 9/2004 | Huck | G06Q 10/10 |
| | | | | 709/248 |
| 2006/0136597 | A1* | 6/2006 | Shabtai | H04L 65/80 |
| | | | | 709/231 |
| 2006/0156362 | A1* | 7/2006 | Perrot | H04N 21/6125 |
| | | | | 725/112 |
| 2007/0101377 | A1* | 5/2007 | Six | H04N 21/64707 |
| | | | | 725/74 |
| 2010/0290667 | A1* | 11/2010 | Lienhart | G06Q 30/0241 |
| | | | | 382/100 |
| 2011/0149145 | A1* | 6/2011 | Ramos | H04N 21/44029 |
| | | | | 348/E7.003 |
| 2011/0242276 | A1* | 10/2011 | Holden | H04N 21/4622 |
| | | | | 348/43 |
| 2012/0023533 | A1* | 1/2012 | Wang | H04L 65/765 |
| | | | | 725/109 |
| 2012/0278833 | A1* | 11/2012 | Tam | H04N 21/47202 |
| | | | | 725/31 |
| 2012/0290937 | A1* | 11/2012 | Rothschild | H04N 21/43637 |
| | | | | 709/219 |
| 2013/0042262 | A1* | 2/2013 | Riethmueller | H04N 21/25866 |
| | | | | 725/14 |
| 2013/0237204 | A1* | 9/2013 | Buck | G01S 19/16 |
| | | | | 455/418 |
| 2014/0281001 | A1* | 9/2014 | Harrison | H04L 65/765 |
| | | | | 709/231 |
| 2014/0282775 | A1* | 9/2014 | Bhat | H04N 13/194 |
| | | | | 725/109 |
| 2015/0249868 | A1* | 9/2015 | Wang | H04N 21/6405 |
| | | | | 725/27 |
| 2015/0288997 | A1* | 10/2015 | Basra | H04N 21/44209 |
| | | | | 725/9 |
| 2016/0381397 | A1* | 12/2016 | Krahnstoever | H04N 21/2183 |
| | | | | 725/146 |
| 2018/0192086 | A1* | 7/2018 | Henaire | H04N 21/23424 |
| 2019/0253764 | A1* | 8/2019 | Gao | H04L 12/4641 |
| 2019/0342594 | A1* | 11/2019 | Korte | H04N 17/004 |
| 2021/0029413 | A1* | 1/2021 | Bilal | H04N 21/6405 |
| 2021/0135772 | A1* | 5/2021 | Brown | H04N 21/262 |
| 2023/0048162 | A1* | 2/2023 | Brown | H04N 21/2187 |

OTHER PUBLICATIONS

Mikityuk et al., "The Virtual Set-Top Box: On the shift of IPTV Service Execution, Service & UI Composition into the Cloud," 2013 17th International Conference on Intelligence in Next Generation Networks (ICIN), 2013, in 8 pages.

* cited by examiner

RESULT

Transmit B1 & B2 to B; cache B1 & B2 – advertisement?

Multicast A1-A4 to A & B

Transmit B7 & B8 to B; cache B7 & B8 – advertisement?

Transmit A5 & A6 to A; cache A5 & A6 – advertisement?

Multicast A7... to A & B

REDUCING NETWORK BANDWIDTH CONSUMPTION OF REAL-TIME BROADCASTS USING GENERICALLY ENCODED MEDIA OBJECTS

CROSS-REFERENCE TO RELATED APPLICATIONS

This application is a continuation of PCT App. No. PCT/US2022/046483 filed Oct. 12, 2022 and entitled "REDUCING NETWORK BANDWIDTH CONSUMPTION OF REAL-TIME BROADCASTS USING GENERICALLY ENCODED MEDIA OBJECTS," which claims priority to U.S. Prov. Pat. App. No. 63/257,558 filed Oct. 19, 2021, each of which is incorporated by reference herein in its entirety for all purposes.

BACKGROUND

Field

The present disclosure generally relates to reducing network bandwidth consumption of real-time broadcasts using generically encoded media objects.

Description of Related Art

Network bandwidth is a limited resource and is susceptible to congestion when too many networked devices communicate too much data at the same time. Different techniques exist to manage bandwidth usage in a network, such as by throttling network usage or imposing quality of service constraints on different types of network traffic.

SUMMARY

According to a number of implementations, the present disclosure relates to a system that includes a network interface, a non-transitory computer-readable medium; and a processor communicatively coupled to the communications interface and the non-transitory computer-readable medium. The non-transitory computer-readable medium includes processor-executable instructions configured to cause the processor to receive a request from a first subscriber for a real-time broadcast from a first content provider; authorize access to the real-time broadcast from the first content provider using credentials corresponding to the first subscriber; request the real-time broadcast from the first content provider; generically encode audiovisual data from the first content provider corresponding to the real-time broadcast to generate a first generically encoded audiovisual data stream by encoding rendered frames of the audiovisual data from video memory; determine that a second generically encoded audiovisual data stream corresponds to the real-time broadcast requested by a second subscriber from a second content provider; and multicast the first generically encoded audiovisual data stream to the first subscriber and to the second subscriber.

In some embodiments, the processor-executable instructions further cause the processor to receive a request from the second subscriber for the real-time broadcast from the second content provider. In further embodiments, the processor-executable instructions further cause the processor to authorize access to the real-time broadcast from the second content provider using credentials corresponding to the second subscriber. In further embodiments, the processor-executable instructions further cause the processor to request the real-time broadcast from the second content provider. In further embodiments, the processor-executable instructions further cause the processor to generically encode audiovisual data from the second content provider corresponding to the real-time broadcast to generate the second generically encoded audiovisual data stream by encoding rendered frames of the audiovisual data from video memory. In further embodiments, the processor-executable instructions further cause the processor to compare the first generically encoded audiovisual data stream to the second generically encoded audiovisual data stream to determine that each corresponds to the real-time broadcast. In further embodiments, the processor-executable instructions further cause the processor to transmit a portion of the second generically encoded audiovisual data stream to the second subscriber responsive to determining that a portion of the second generically encoded audiovisual data stream differs from the first generically encoded audiovisual data stream. In some further embodiments, determining that the first generically encoded audiovisual data stream and the second generically encoded audiovisual data stream correspond to the real-time broadcast comprises comparing metadata of the first generically encoded audiovisual data stream to metadata of the second generically encoded audiovisual data stream. In some further embodiments, determining that the first generically encoded audiovisual data stream and the second generically encoded audiovisual data stream correspond to the real-time broadcast comprises comparing fingerprints of chunks of each generically encoded audiovisual data stream.

In some embodiments, the processor-executable instructions further cause the processor to initiate a virtual screen session for rendering the audiovisual data stream from the first content provider. In some embodiments, the processor-executable instructions further cause the processor to send information regarding interactions of the first subscriber with a website or application of the first content provider. In further embodiments, the processor-executable instructions further cause the processor to generate an interface that mimics the website or application of the first content provider, the first subscriber interacting with the generated interface.

According to a number of implementations, the present disclosure relates to a method for reducing bandwidth consumption. The method includes receiving a request from a first subscriber for a real-time broadcast from a first content provider. The method further includes authorizing access to the real-time broadcast from the first content provider using credentials corresponding to the first subscriber. The method further includes requesting the real-time broadcast from the first content provider. The method further includes generically encoding audiovisual data from the first content provider to generate a first generically encoded audiovisual data stream by encoding rendered frames of the media object. The method further includes determining that a second generically encoded audiovisual data stream corresponds to the real-time broadcast requested by a second subscriber from a second content provider. The method further includes multicasting the first generically encoded audiovisual data stream to the first subscriber and to the second subscriber.

In some embodiments, determining that the first generically encoded audiovisual data stream and the second generically encoded audiovisual data stream correspond to the real-time broadcast comprises comparing metadata of the first generically encoded audiovisual data stream to metadata of the second generically encoded audiovisual data stream. In some embodiments, determining that the first generically encoded audiovisual data stream and the second generically encoded audiovisual data stream correspond to the real-time broadcast comprises comparing fingerprints of chunks of each generically encoded audiovisual data stream.

In some embodiments, the method further includes initiating a virtual screen session for rendering the audiovisual data from the first content provider. In further embodiments, the method further includes generically encoding audiovisual content from the second content provider to generate the second generically encoded audiovisual data stream by encoding rendered frames of the media object from video memory using a second virtual screen session.

In some embodiments, the method further includes sending information regarding interactions of the first subscriber with a website or application of the first content provider. In further embodiments, the method further includes generating an interface that mimics the website or application of the first content provider, the first subscriber interacting with the generated interface.

In some embodiments, the method further includes identifying chunks of the second generically encoded audiovisual data stream that do not have a sufficiently similar fingerprint to the first generically encoded audiovisual data stream and storing the identified chunks as an advertisement in a cache. In some embodiments, the audiovisual data is received from the first content provider in a first encoding and from the second content provider in a second encoding different from the first encoding.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1A:
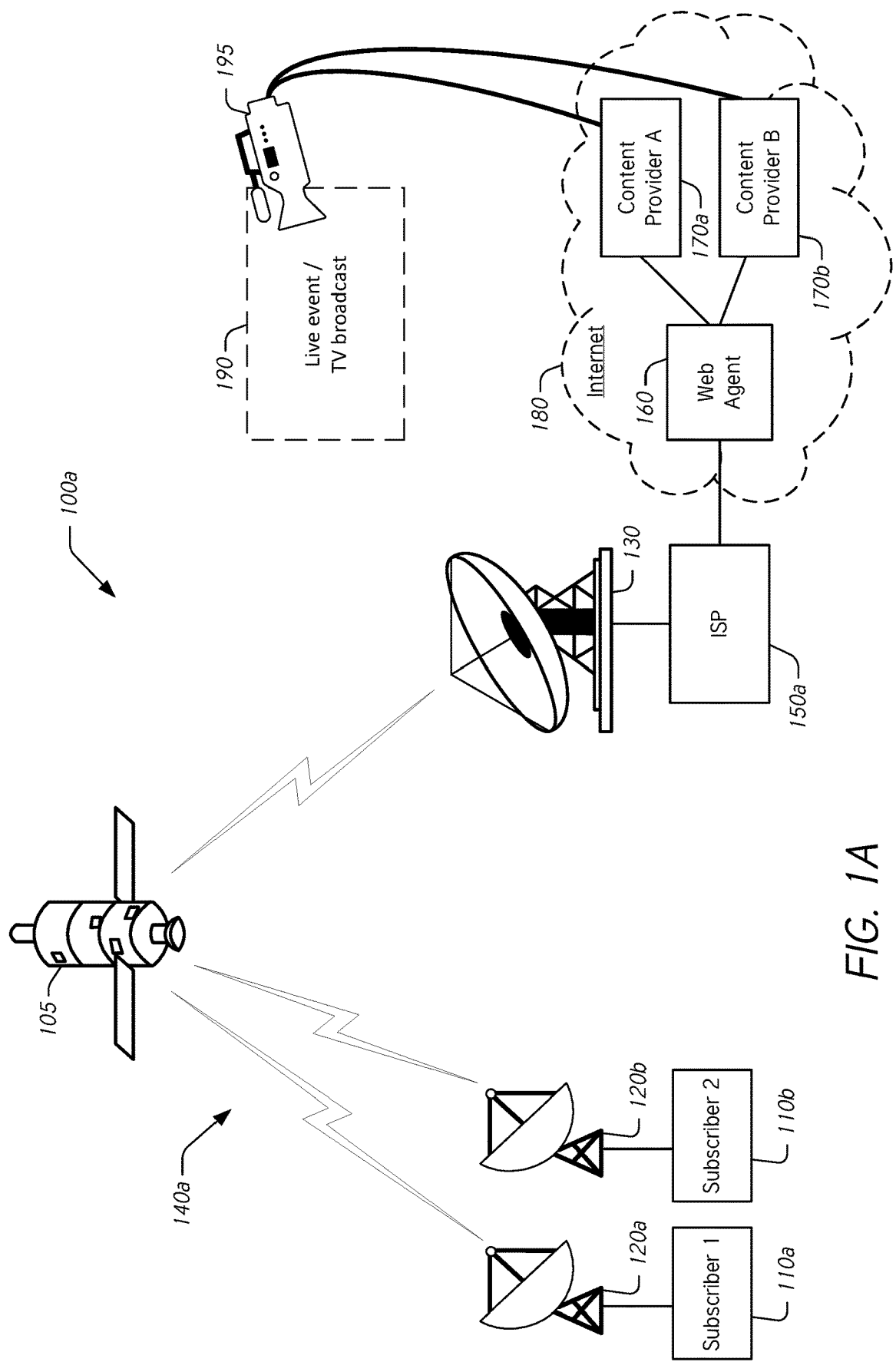
FIGS. 1A and 1B illustrate diagrams of example network environments that include a web agent to generically encode real-time broadcasts to reduce network bandwidth consumption.

The headings provided herein, if any, are for convenience only and do not necessarily affect the scope or meaning of the claimed invention.

Overview

Internet service providers (each an "ISP") provide access to the Internet via a communications medium, such as over co-axial cable, fiber optic cable, via radio frequency ("RF") communications, such as satellite or cellular, etc. An ISP's subscribers will use equipment, such as a cable modem or a satellite transceiver and dish, to send and receive data and, thereby, access the Internet. Many subscribers may use their Internet connection to watch live video content, such as TV channels, sporting events, news reports, concerts, etc., provided by content providers (e.g., YOUTUBETV®, HULU®, PHILO®, FUBOTV®, SLING®, etc.). A subscriber can access a desired content provider, provide login information, and select a channel or live event to watch. In response, the content provider transmits the audiovisual content of that channel and/or live event to the subscriber. This can also be referred to as "streaming" the live event or channel to the subscriber meaning that the audiovisual data is transmitted at a rate that enables the subscriber to watch the channel or live event as it is being broadcast, or without needing to buffer a significant portion of the audiovisual data prior to beginning watching, so that playback is not interrupted while more audiovisual data is received.

Once live content begins, the subscriber receives the audiovisual content as it happens and new viewers that begin viewing the content start mid-stream, rather than from the beginning. For popular events or channels, many different subscribers may request to stream the same content, which may be provided by different content providers, simultaneously. For example, popular sporting events such as the Olympics or the Superbowl may be streamed by hundreds or thousands of people as the events are occurring. However, when different viewers request access to the same live event, the live content may be separately streamed to each viewer. This consumes a significant amount of the ISP's bandwidth as each individual stream traverses the ISP's network to arrive at a subscriber's device, e.g., a television or computer. In addition, for a given event or live broadcast of a channel the content being streamed to each subscriber is essentially identical, even if it is being streamed from different content providers by different people. Thus, providing subscribers the ability to watch a live event or channel in real time or as it is broadcast typically results in the content provider and the ISP separately streaming the content to each individual subscriber, consuming network bandwidth resources.

This scenario represents a shortcoming in typical media content delivery systems. To reduce or minimize bandwidth consumption on a satellite or other communications link, a service provider (e.g., an ISP) may multicast a single instance of the same audiovisual data stream (e.g., a live event or broadcast channel) to multiple subscribers. For example, when one subscriber is watching a live event, the ISP may determine that one or more subscribers on the same communications link is watching the same live event. In response to this determination, the ISP may then multicast the live event data stream to each of the subscribers rather than individually streaming the same live event to each subscriber.

However, different content providers may encode the same audiovisual data stream differently. The result is that the same audiovisual data stream originating from different content providers appears to be and is treated as different audiovisual data streams. For this reason, audiovisual data streams representing the same live event or the same broadcast channel that are provided by different content providers may not be advantageously multicast to multiple subscribers even though the content providers are providing the same audiovisual data stream (e.g., the same live event or broadcast channel).

Accordingly, to address these and other issues, described herein are systems, methods, and devices that advantageously reduce bandwidth use for real-time broadcasts of events and channels between the ISP and its subscribers by re-encoding audiovisual data streams to have a generic encoding that can be viewed by subscribers of different content providers. The disclosed systems, methods, and devices can be configured to determine that a plurality of subscribers is watching the same live event and can multicast the generic encoding of the live event to the plurality of subscribers, even where individual subscribers stream the live event from different content providers. Consequently, when a subscriber makes an authorized request to watch a live event from a content provider, the live event gets rendered by a web agent and re-encoded using an encoding scheme that is playable by subscribers of the ISP, referred to herein as a generic encoding or a generically encoded audiovisual data stream. The re-encoded live event can be multicast to subscribers watching the same live event, regardless of which data provider each subscriber uses. This can eliminate the need for streaming multiple versions of the same live event from different content providers to subscribers. The disclosed systems and methods are therefore configured to identify when differently-encoded audiovisual data streams represent the same live event, to generically encode an audiovisual data stream of the live event to generate a single audiovisual data stream for the live event, and to multicast the generically encoded audiovisual data stream to subscribers watching the same live event, rather than requiring individual subscribers to stream the live event from different content providers.

The disclosed systems provide the described advantages using a web agent (e.g., a cloud agent). The web agent is configured to be transparent to the content provider by creating a virtual screen session that renders content from the content provider as if it were the subscriber. This includes transmitting user actions to the content provider based on interactions with an ISP-provided interface that mimics or substitutes the interface provided by the content provider. The web agent uses the virtual screen session to render the audiovisual data stream of the live event and to provide the rendered audiovisual content to a generic encoder to generically encode the audiovisual data stream. The web agent, or the ISP, then provides the generically encoded audiovisual data stream for transmission to one or more subscribers watching the live event.

By way of example, a first subscriber requests to stream a particular live event from a first content provider. The web agent determines that the first subscriber is authorized to access the requested live event and, in response, streams the live event from the first content provider. The web agent streams the live event using a virtual screen session from the first content provider and creates a generic encoding of the audiovisual data stream of the live event. The generically encoded audiovisual data stream is multicast to the first subscriber and to other authorized subscribers responsive to determining that the other subscribers have requested to watch the same live event. For example, responsive to a second subscriber requesting to watch the live event from a second content provider, the web agent determines that the second subscriber is authorized to access the live event on the second content provider and includes the second subscriber in the multicast of the generically encoded audiovisual data stream of the live event.

In some embodiments, a subscriber executes a software client or application provided by the ISP rather than using an application or website provided by the content provider. Instead, the web agent utilizes application or website provided by the content provider. Thus, when a customer uses the ISP's software client to access a content provider, the ISP software client sends commands to the web agent to access that content provider. The web agent receives that command and sends the command to the content provider through the virtual screen session running the content provider's application or website. Display data received by the client software at the web agent is then rendered using the virtual screen session, re-encoded using an encoder, and sent to the ISP software client executed at the subscriber device, which then renders it for display. Thus, in some implementations, it appears to the subscriber that they are running the content provider's application or website and interacting with it, even though interactions with the content provider are actually handled by the web agent.

The disclosed systems and methods may be particularly advantageous for subscribers of a satellite-based ISP that are located within a geographic region served by a particular satellite because these subscribers may all be capable of receiving the content being broadcast by that satellite at any given time. For example, if one subscriber begins watching a live football game, the ISP's satellite can transmit that content to the subscriber. Transmitting the content to the subscriber makes it potentially available to other subscribers in the geographic region. If another subscriber in that same geographic region subsequently requests to watch the same football game, the ISP can instruct the new subscriber's equipment to receive the existing content stream, rather than starting a new stream to the new subscriber. As additional subscribers request the same live content, the ISP does not need to retransmit the live content but can instead instruct each new subscriber's equipment to access the existing live content stream. This works even where subscribers use different content providers because the existing content stream is generically encoded or encoded in a way that is accessible to subscribers of the satellite-based ISP. This reduces bandwidth consumption associated with streaming the live event because the ISP does not need to transmit separate data streams for the live event to individual subscribers.

Similar advantages arise in implementations that provide satellite network service to moving crafts, such as aircraft, boats, trains, buses, etc. For example, a satellite transceiver onboard an airplane may receive a single audiovisual data stream for a live event and multicast that single audiovisual data stream to multiple passengers, even where passengers use different content providers to stream the live event.

Throughout this disclosure reference is made to real-time broadcasts, live events, live content, channel broadcasts, TV broadcasts, and the like, which is to be understood to refer to audiovisual content (video and audio and possibly text such as subtitles or closed captioning) that is broadcast by a content provider in real time and in no way should be interpreted to limit the disclosure to certain kinds of live events or broadcast content. Similarly, throughout this disclosure reference is made to live events in the context of streaming audiovisual data, and the terms live event and audiovisual data stream may be used interchangeably in certain descriptions to refer to the stream of digital data provided by a content provider that shows the broadcast of the live event or TV broadcast.

Example Network Environments

FIG. 1A illustrates a diagram of an example network environment 100*a* that includes a web agent 160 to generically encode real-time broadcasts to reduce network bandwidth consumption. The network environment 100*a* includes a satellite network 140*a* that communicatively couples subscribers 110*a*, 110*b* and an ISP 150*a* to one another and to a network (such as the Internet 180). The subscribers 110*a*, 110*b* can be at a fixed location or in a mobile vehicle such as an airplane, boat, car, bus, train, etc. The network environment 100*a* may utilize various network architectures that include space and ground segments. For example, the space segment may include one or more satellites, while the ground segment may include one or more satellite user terminals, gateway terminals, network operations centers (NOCs), satellite and gateway terminal command centers, and/or the like. Some of these elements are not shown in the figure for clarity. In some embodiments, the satellite network 140*a* can include a geosynchronous earth orbit (GEO) satellite or satellites, a medium earth orbit (MEO) satellite or satellites, and/or a low earth orbit (LEO) satellite or satellites. In some embodiments, the satellite 105 is a satellite network with a plurality of satellites. In some embodiments, the satellite 105 can include a geosynchronous earth orbit (GEO) satellite or satellites, a medium earth orbit (MEO) satellite or satellites, and/or a low earth orbit (LEO) satellite or satellites. In some embodiments, as described herein, the access network can be any suitable network including an entirely terrestrial-based network.

The satellite network 140*a* includes a forward link for sending information from the ISP 150*a* to subscribers 110*a*, 110*b*, and a return link for sending information from the subscribers 110*a*, 110*b* to the ISP 150*a*. The forward link includes a transmission path from the ISP 150*a* through a gateway satellite transceiver 130, through a satellite 105 via a satellite uplink channel, to the subscriber satellite transceivers 120*a*, 120*b* via a satellite downlink channel, and to the subscribers 110*a*, 110*b*. The return link includes a transmission path from the subscriber satellite transceivers 120*a*, 120*b* to the satellite 105 via the satellite uplink channel, to the gateway satellite transceiver 130 via the satellite downlink channel, and to the ISP 150*a*. Each transmission channel may utilize multiple satellites and transceivers.

The subscribers 110*a*, 110*b* are configured to transmit data to the ISP 150*a* through the satellite network 140*a* via the return link. After reaching the ISP 150*a*, the data can then be directed to the Internet 180. Data from the Internet 180 can be sent to the subscribers 110*a*, 110*b* by the ISP 150*a* via the forward link of the satellite network 140*a*. The subscribers 110*a*, 110*b* include devices such as customer premises equipment (CPE), routers, set-top boxes, general purpose computers (e.g., desktops, laptops, etc.), tablets, smartphones, and the like that enable users to access and interact with a network (e.g., the Internet 180). Such subscriber devices 110*a*, 110*b* may be within a subscriber's living space or office, in a vehicle (e.g., an airplane, train, ship, bus, car, etc.), or they may be portable (e.g., smartphones, laptops, etc.). Any suitable computing device appropriately configured according to this disclosure may be a suitable subscriber 110*a*, 110*b*. In some embodiments, the subscribers 110*a*, 110*b* are within the same spot beam of the satellite 105.

The ISP 150*a* provides a subscription-based service connecting subscribers 110*a*, 110*b* to the network 180 (e.g., the Internet) via the satellite network 140*a*. The ISP 150*a* includes network management systems to manage network traffic flow to individual subscribers 110*a*, 110*b* sharing the satellite network link 140*a*. The ISP 150*a* may include a hub or ground station. In certain embodiments, the ISP 150*a* is configured or designed to service forward uplink signals to a satellite 105, and to return downlink signals from the satellite 105. The ISP 150*a* can include a service provider gateway or service provider system that manages data across the satellite network 140*a*, including scheduling network traffic and interacting with the subscribers 110*a*, 110*b*.

The ISP 150*a* may also provide an interface between the Internet 180 and the satellite 105 and/or another network. The ISP 150*a* may receive data and information from the Internet 180 that includes content from content providers 170*a*, 170*b* that is directed to the subscribers 110*a*, 110*b*. The ISP 150*a* may format data and information for delivery to the subscribers 110*a*, 110*b* via the satellite 105 and the ISP 150*a* may also interact with the subscribers 110*a*, 110*b* to provide instructions or other information. The ISP 150*a* may also receive signals carrying data and information from the satellite 105. This data and information may be transmitted by the subscribers 110*a*, 110*b* and directed to destinations accessible via the Internet 180. The ISP 150*a* may format this data and information for delivery via the Internet 180. The Internet 180 may connect the ISP 150*a* with other gateway routing devices that may be in communication with the satellite 105 or with other satellites. In some embodiments, part or all of the ISP 150 can be located in a virtual device residing in a public or private computing cloud and/or implemented in a distributed computing environment.

The web agent 160 can be implemented in whole or in part on the Internet 180 or in whole or in part in a service provider system. The web agent 160 can be configured to specifically interact with the subscribers 110*a*, 110*b* and content providers 170*a*, 170*b* via the ISP 150*a*. The web agent 160 does this to improve network bandwidth consumption by generically encoding real-time broadcasts from the content providers 170*a*, 170*b* for delivery to the subscribers 110*a*, 110*b*. The web agent 160 can be configured to stream a real-time broadcast 190 (e.g., a live event or TV channel broadcast) delivered to the content providers 170*a*, 170*b* through a broadcast entity 195, the real-time broadcast 190 rendered within the web agent 160 to enable generation of a generically encoded audiovisual data stream of the real-time broadcast 190. This can be used to remove encodings layered on the real-time broadcast by the content providers 170*a*, 170*b* so that the real-time broadcast 190, in the form of the generically encoded audiovisual data stream, can be multicast to multiple subscribers 110*a*, 110*b*. As used herein, the terms "generically encoded" or "generic encoding" may refer to any digital encoding of a digital file or digital data that is accessible to the subscribers 110*a*, 110*b* and does not necessarily refer to any particular encoding scheme. Thus, the term generic is used in a broad sense to differentiate it from proprietary encoding schemes that limit access to media objects to customers of specific content providers.

Although not illustrated, it is to be understood that the ISP 150a and the web agent 160 includes one or more processors configured to execute computer executable instructions that implement software modules and functions to generically encode real-time broadcasts, to authorize and access real-time broadcast data streams from content providers 170a, 170b, to determine similarities between real-time broadcast data streams, and the like. The ISP 150a and the web agent 160 can each include one or more data storage devices or caches configured to store audiovisual data, metadata associated with audiovisual data, fingerprinting or other content-identifying data associated with audiovisual data, subscriber credentials, and the like as well as computer executable instructions. Examples of suitable processors and data storage devices are provided elsewhere herein.

In some embodiments, content delivered in the forward link is beamed to each subscriber in a spot beam provided by the satellite 105. This applies to generically encoded audiovisual data generated at the web agent 160. In such embodiments, it may be advantageous to multicast the generically encoded audiovisual data stream to a plurality of the subscribers within the spot beam. This can be done to eliminate duplicate transmissions of the same real-time broadcasts, thereby reducing network bandwidth consumption associated with streaming real-time broadcasts over the satellite link 140a. The disclosed technology is particularly advantageous in eliminating duplicate real-time broadcasts provided by different content providers where the audiovisual data streams principally differ only in the different encoding schemes implemented by the content providers.

By way of example, as the subscribers 110a, 110b request content from the content providers 170a, 170b, the audiovisual data streams are streamed through the satellite 105 and the respective subscriber's satellite transceiver 120a, 120b which decodes the portion of the beam having the requested content. Thus, while the entirety of the satellite beam, e.g., many different channels spread across a range of frequencies, timeslots, etc., may be received by a particular transceiver, the transceiver may only decode a portion of the beam. Thus, while subscriber 110a receives and decodes content it has requested, it also receives, but ordinarily does not decode, content requested by subscriber 110b. This is the case even if each subscriber 110a, 110b has requested the same content (albeit from different content providers 170a, 170b). In conventional cases, the ISP 150a would separately stream the same content to the different subscribers 110a, 110b using different channels within the satellite's beam. However, the disclosed technologies enable multicasting of a single generically encoded audiovisual data stream for each unique real-time broadcast.

For example, if a real-time broadcast 190 is something that many subscribers would likely stream, like a popular sporting event, each of the subscribers in the spot beam has the opportunity receive that content for viewing using multicasting techniques (e.g., decoding a single data stream corresponding to the real-time broadcast rather than a unique data stream for each subscriber). Thus, in addition to sending the generically encoded audiovisual data to the subscriber that initially requested the real-time broadcast from a particular content provider, the ISP 150a can be configured to multicast the generically encoded audiovisual data stream to other subscribers over the satellite network 140a that also requested to view the real-time broadcast, even where the other subscribers use different content providers. The ISP 150a and web agent 160 can analyze requests from subscribers and data streams destined for subscribers to determine whether the data streams represent the same real-time broadcast and, if this is the case, to multicast a single generically encoded audiovisual data stream for each real-time broadcast 190. Thus, the ISP 150a conserves the satellite bandwidth that it otherwise would have used to provide duplicate transmissions of the real-time broadcast 190. For very popular events or TV broadcasts that are watched by many subscribers simultaneously, the ISP 150a can significantly reduce the number of total transmissions of that content. This can potentially reduce the impact to its subscriber-facing bandwidth, potentially improving responsiveness and available bandwidth for its subscribers for other functions.

The content providers 170a, 170b discussed herein are streaming live video content providers, such as a television station or sports content provider, and in various examples may be any suitable content provider, such as online video hosting platforms (e.g., YOUTUBE®), video game streaming sites (e.g., TWITCH®), or any other content provider that provides live-streamed content of any kind. While the illustrative example describes a "geographic region" in terms of physical geography due to its use of a wireless broadcast, some wired transmission media, such as cable-based or optical-based communications, employ broadcast-like transmission media and thus, an ISP employing one of these communications media may use these techniques in a multicast transmission to customers in a "logical" geographic region, e.g., customers within a particular IPv4 or IPv6 subnet, independent of their physical locations.

Figure 1B:
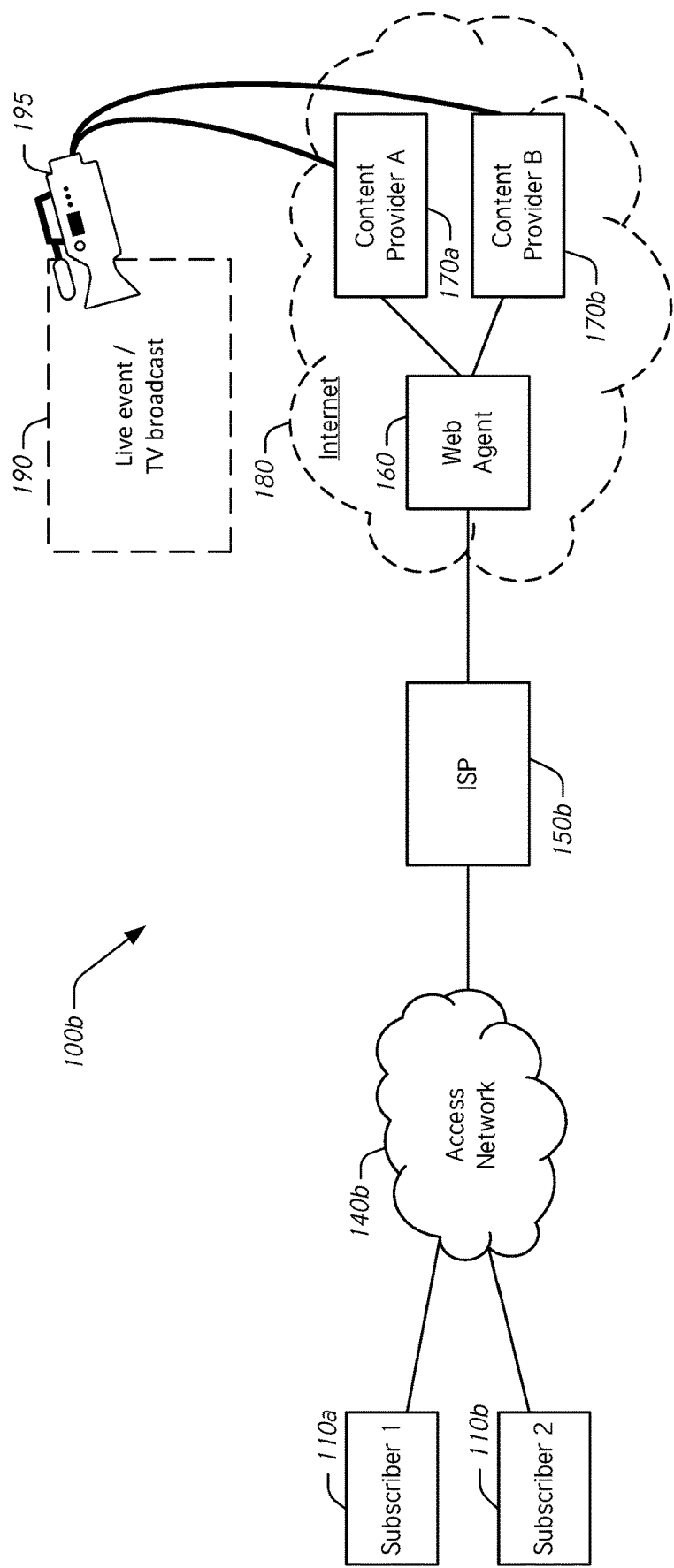

FIG. 1B illustrates an example network environment 100b that includes an access network 110b that couples the subscribers 110a, 110b to the ISP 150b. The network environment 100b is similar to the network environment 100a described herein with reference to FIG. 1A, wherein the access network 140b can be a terrestrial network, a satellite network, or a combination of a terrestrial network and a satellite network. The remaining components of the network environment 100b provide the same relevant functionality as those components of the network environment 100a described herein with reference to FIG. 1A with the understanding that communication between the subscribers 110a, 110b and the ISP 150b is provided using the access network 140b.

In various embodiments, the access network 140b may be any type of network and may include, for example, the Internet, an IP network, an intranet, a wide-area network (WAN), a local-area network (LAN), a virtual private network (VPN), a public switched telephone network (PSTN), a public land mobile network, a digital subscriber line (DSL), a cellular network, wireless local area network (WLAN) access point (AP) connected to DSL, or any combination of these. The access network 140b may be a hybrid network. A hybrid network can include a network with multiple parallel paths each having a different transport characteristic (e.g., a first path is a satellite, a second path is a DSL or cellular connection, etc.). In hybrid networks, traffic can be routed across the path whose transport characteristic is beneficial or most advantageous for that type of traffic.

The ISP 150b provides a subscription-based service connecting subscribers 110a, 110b to the target network 180 (e.g., the Internet). The ISP 150b includes network management systems configured manage network traffic flow to individual subscribers 110a, 110b coupled to the access network 140b. The ISP 150b may provide Internet access via cable, e.g., using RF frequencies transmitted over a co-axial wired connection, a cellular network via one or more cellular base stations, a fiber optic network, a TV or radio broadcast network, etc. The subscribers 110a, 110b may be grouped based on geography, network structures, subscription plans, network equipment, or the like.

As in the network environment 100a, the network environment 100b provides a web agent 160 that is configured to interface with content providers 170a, 170b on the Internet 180. The web agent 160 streams requested and authorized real-time broadcasts 190 from the content providers 170a, 170b to generate generically encoded audiovisual data streams for multicasting to subscribers connected to the network 180 through the access network 140b. The ISP 150b manages multicasting the generically encoded audiovisual data streams, identifies identical real-time broadcasts based on metadata and/or fingerprinting techniques or other suitable content-identifying techniques, and multicasts appropriate generic encodings of real-time broadcasts in response to requests for content from content providers, as described in greater detail herein.

Figure 2A:
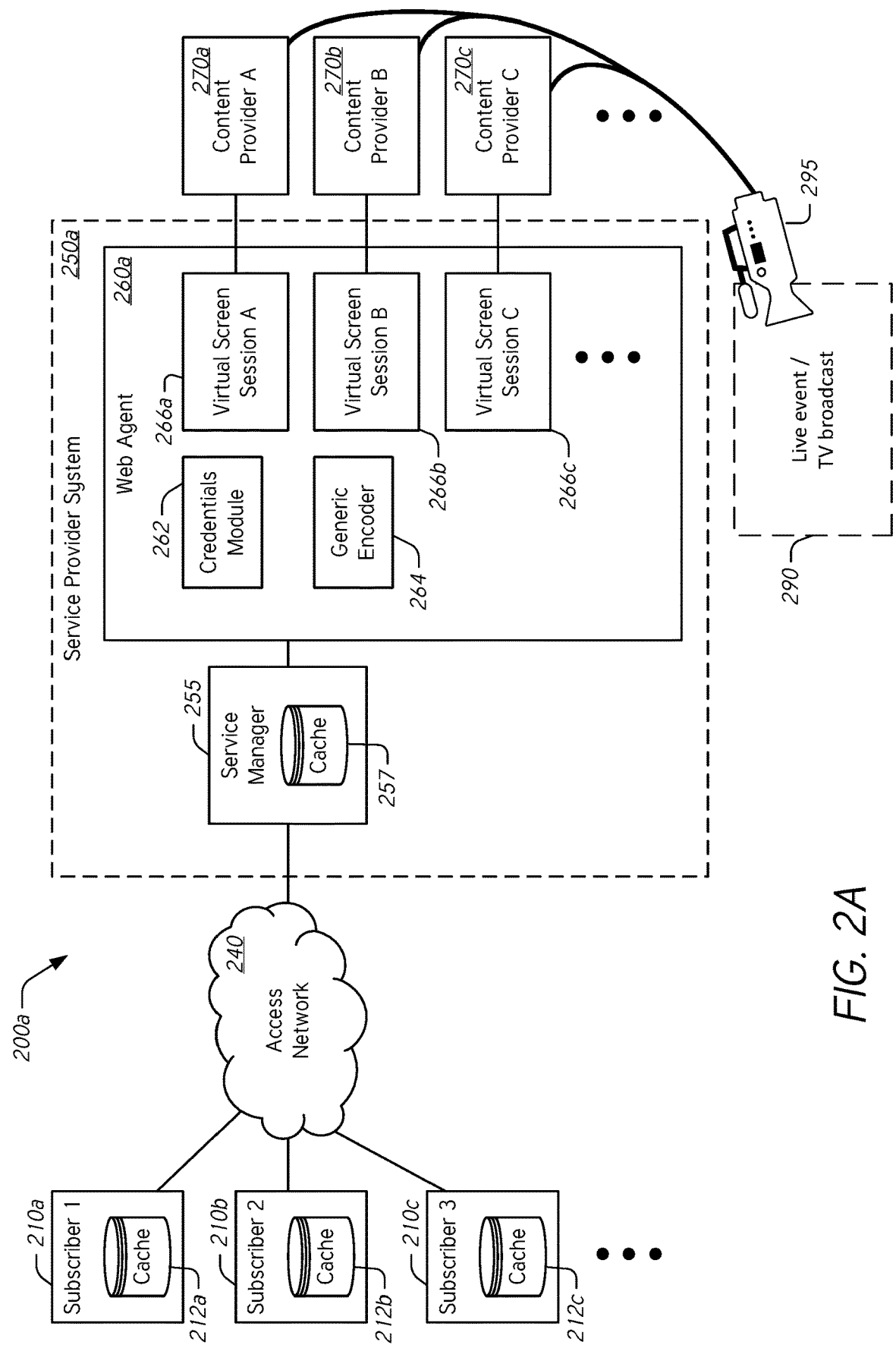
FIGS. 2A and 2B illustrate web agents for generically encoding real-time broadcasts in example network environments.
Figure 2B:
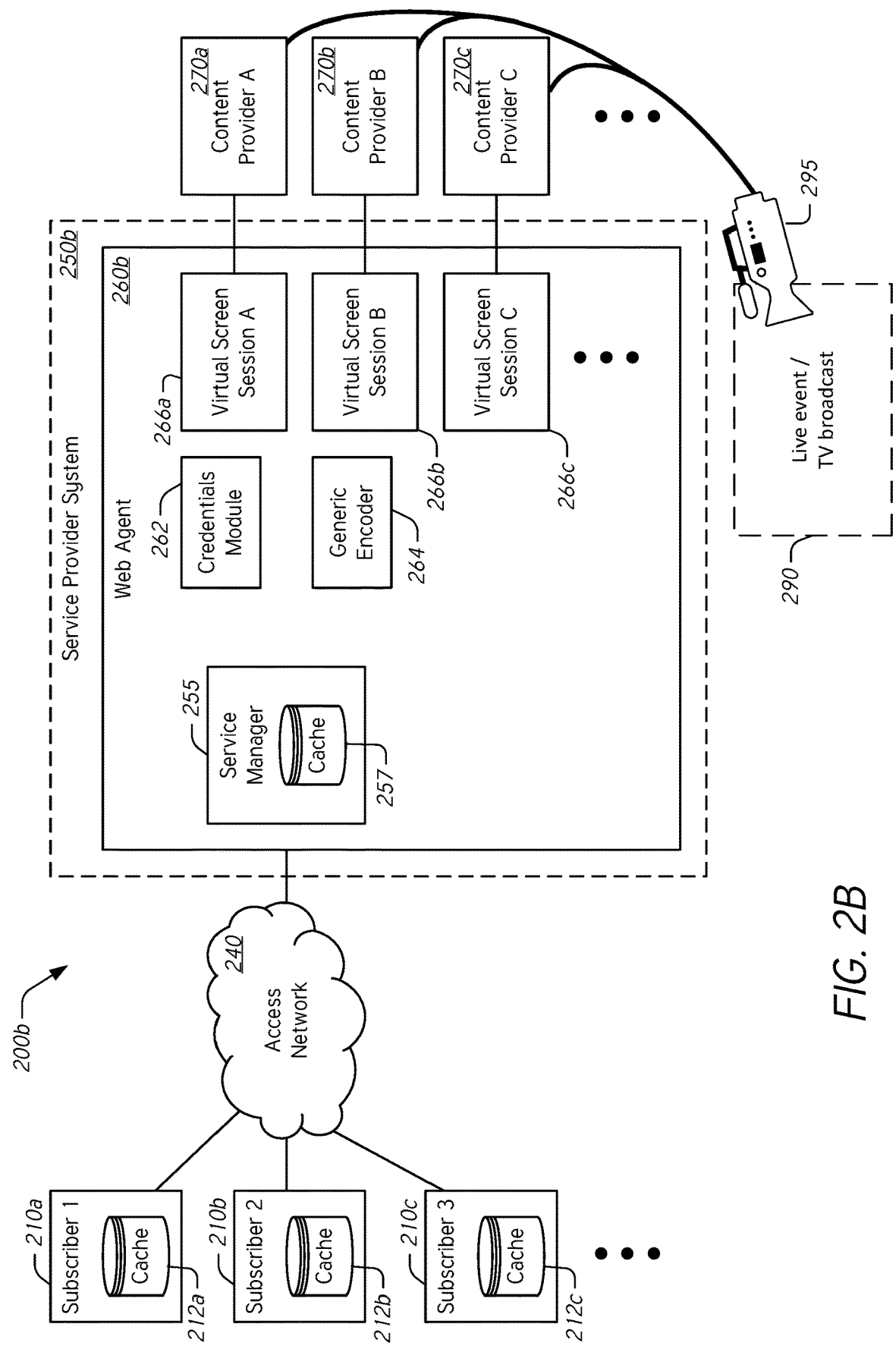

FIGS. 2A and 2B illustrate web agents 260a, 260b for generically encoding real-time broadcasts 290 in example network environments 200a, 200b. The network environments 200a, 200b can be any of the network environments described herein, such as the network environments 100a, 100b described herein with respect to FIGS. 1A and 1B, respectively. The network environments 200a, 200b include access network 240 that provides connectivity between subscribers 210a-210c and content providers 270a-270c through a service provider system 250a, 250b and a web agent 260a, 260b. The access network 240 can be any of the access networks described herein, such as the networks 140a, 140b described herein with reference to FIGS. 1A and 1B, respectively. The subscribers 210a-210c are similar to the subscribers 110a, 110b described herein with reference to FIGS. 1A and 1B. The subscribers 210a-210c include hardware, such as processors and memory, for performing the disclosed functions and processes, and in particular include respective caches 212a-212c, where caches include non-volatile and/or volatile memory and/or data storage devices. The caches 212a-212c can be configured to store generically encoded media objects generated by the web agent 260a, 260b. In some embodiments, media objects stored in the caches 212a-212c correspond to advertisements or other portions of a real-time broadcast that are unique to individual content providers. The content providers 270a-270c are similar to the content providers 170a, 170b described herein with reference to FIGS. 1A and 1B.

The content providers 270a-270c provide audiovisual data streams of a real-time broadcast 290 (e.g., a live event or TV broadcast), the real-time broadcast 290 captured and broadcast by a broadcaster 295. Examples of a broadcaster 295 may include a particular TV channel (e.g., NBC, CBS, ESPN, etc.), a content creator providing a live video feed, a web cam, or the like. The broadcaster 295 provides or broadcasts copies of the real-time broadcast 290 to multiple content providers 270a-270c. For example, ESPN (an example of a broadcaster 295) may broadcast a sporting event which is provided to HULU, YOUTUBE TV, SLING TV, and its own network application (examples of content providers 270a-270c). A first subscriber 210a requests to view the sporting event broadcast by ESPN using HULU, the content provider 270a to which they subscribe. A second subscriber 210b requests to view the same sporting event broadcast by ESPN using YOUTUBE TV, the content provider 270b to which they subscribe. The web agent 260a, 260b renders the individual audiovisual data streams from HULU and YOUTUBE TV and generically encodes each audiovisual data stream. The service manager 255 (or the web agent 260a, 260b) determines that the individual generically encoded audiovisual data streams from the different content providers represent the same sporting event on ESPN and multicasts a single instance of the generically encoded audiovisual data stream to the first subscriber 210a and to the second subscriber 210b.

The network environments 200a, 200b each include a service provider system 250a, 250b similar to the ISP 150a, 150b described herein with respect to FIGS. 1A and 1B, respectively. The service provider systems 250a, 250b manage network communication on the access network 240, examples of which are provided herein. The service provider systems 250a, 250b include web agents 260a, 260b and a service manager 255. The web agents 260a, 260b provide the processes and functions described in greater detail elsewhere herein, such as interfacing with content providers 270a-270c and generating generically encoded audiovisual data streams from authorized requests for real-time broadcasts from the content providers 270a-270c. The service manager 255 is configured to compare audiovisual data, to fingerprint or otherwise generate content-identifying data for audiovisual data streams, to multicast generically encoded audiovisual data streams, and the like as described in greater detail herein. The service manager 255 includes a cache 257 or data store configured to store metadata, audiovisual data content-identifying information (e.g., fingerprint information), generically encoded audiovisual data, and the like. The cache 257 includes any suitable device or mechanism for storing information, including volatile and non-volatile memory and data storage devices. The network environment 200a, illustrated in FIG. 2A, implements the service manager 255 separately from the web agent 260a, whereas the network environment 200b, illustrated in FIG. 2B, implements the service manager 255 as part of the web agent 260b. Thus, it is to be understood that, with respect to the functionality described herein, the service provider system 250a, 250b can be implemented in a variety of ways but the functionality is not to be limited due to the particular configuration of the individual components or elements and that the disclosed methods and functionality can be achieved with a web agent implemented on the Internet (e.g., in a cloud environment), with a web agent implemented as part of the ISP's system for managing network traffic, and/or with a web agent implemented in a distributed computing environment with components of the web agent implemented in different places on the ISP's network.

The web agent 260a, 260b includes a credentials module 262, a generic encoder 264, and virtual screen sessions 266a-266c corresponding to content providers 270a-270c. Each virtual screen session 266a-266c is configured to interface with a particular content provider and to render audiovisual data provided by that content provider. The virtual screen sessions 266a-266c utilize renderers to render frames of audiovisual data and put the frames into video memory. This allows the generic encoder 264 to generically encode the audiovisual data, thereby removing any proprietary and/or specific encoding applied by the content provider and enabling access to any of the authorized subscribers 210a-210c. Description of this process is provided in greater detail herein with respect to FIGS. 3 and 6.

The virtual screen sessions 266a-266c implemented by the web agent 260a, 260b receive content from the content providers 270a-270c and renders the content, e.g., by generating video frames, audio output, and/or text overlays (e.g., subtitles or closed captioning). The rendered audiovisual data is typically sent to memory in a display device, e.g., a video card or similar device, for use in displaying the content. This output may instead be diverted or sampled for use by the generic encoder 264.

The generic encoder 264 obtains rendered data from the virtual screen sessions 266a-266c and encodes it for transmission to the one or more subscribers 210a-210c. The generic encoder 264 may apply encryption or DRM access controls to the rendered content to reduce the chance the content will be accessed by an unauthorized person. Any suitable encoding or DRM scheme may be used by the generic encoder 264. However, it should be appreciated that in some examples, a common encoding scheme is used for all content transmitted from the service provider system 250a, 250b to the downstream subscribers 210a-210c over the access network 240. This can help facilitate content recognition, discussed herein, as re-encoded content using the service provider's generic encoder 264 can be sampled, processed, and compared to previously identified re-encoded content without regard for differences in the various encoding schemes used by different content providers. In some embodiments, certain authorized subscribers 210a-210c receive information such as access keys, credentials, etc. to decode any DRM access control or other encryption applied by the generic encoder 264.

In some embodiments, the service provider system 250a, 250b (e.g, through the web agent 260a, 260b) is configured to provide a subscriber-facing interface that corresponds to or mimics the content provider's interface, application, or website. This allows the subscribers 210a-210c to interact with an interface similar or identical to the content provider's interface while also allowing the web agent 260a, 260b to capture and pass on feedback to the respective content providers, the feedback including user actions, as described in greater detail herein.

The cache 257 stores a wide variety of information used by the service provider system 250a, 250b. The cache 257 stores information to help identify requested content, as described herein, to enable access to content providers, to track which content is being streamed to which subscriber device, etc. Such information may include content-identifying information (e.g., fingerprint information) for content; metadata or manifest information corresponding to requested content; user access information for one or more content providers, such as login names and passwords; cache information describing content that has been instructed by the service provider system 250a, 250b to be stored on one or more subscriber devices 210a-210c; etc.

Identification of content received from one or more content providers can be provided by the service manager 255. The service manager 255 may analyze metadata or manifest information; downsample or generate content-identifying information (e.g., fingerprints) for rendered content, such as audio or video frames; generate hash or similar information for received content; etc. Further, the service manager 255 may receive such information from the web agent 260a, 260b, from the generic encoder 264, or from the cache 257 (or any other suitable component of the service provider system 250a, 250b). In addition, the service manager 255 can analyze audiovisual data streams sequentially (either before or after) or in parallel with encoding the content for transmission by the generic encoder 264. The service manager 255 may then output identification information for received content and may store or update such information within the cache 257.

A challenge addressed by the web agent 260a, 260b (e.g., using the virtual screen sessions 266a-266c) is that content providers 270a-270c typically protect their content using digital rights management ("DRM") encoding, which essentially encrypts the content. In addition, the DRM-encoded content is typically transmitted over an encrypted communications channel, e.g., a secure hypertext transfer protocol ("https") connection. Thus, the ISP itself is not able to access the content streamed to its subscribers because it has been encrypted twice: using the DRM encoding and within the https connection. Thus, under ordinary circumstances, the ISP cannot identify what content a subscriber has requested. To address this challenge, the web agent 260a, 260b uses the virtual screen sessions 266a-266c to request real-time broadcast content from a content provider and subsequently accesses the content itself due to the virtual screen sessions 266a-266c being able to request, receive, and decode content from the content provider. The service manager 255 can then determine, based on rendering the decoded content, which content has been requested and, if appropriate, multicast the generically encoded audiovisual data to a plurality of its subscribers that have requested to watch the real-time broadcast 290.

The subscribers 210a-210c then execute the service provider's client software, which can emulate content providers' software clients. Thus, when a subscriber uses the service provider's custom software client, it appears to the subscriber that they are interacting with one of their content provider's software clients. The subscriber can then provide commands or information, e.g., access credentials, for the content provider, which are transmitted to the service provider system 250a, 250b. After which, the subscriber can navigate a user interface of the content provider's software client and select content for streaming. The subscriber's actions can be passed to the content providers as feedback to enable a pass-through for subscriber actions between the service provider's client software and the content provider's interface.

Examples of Encoding Media Objects

FIGS. 3A, 3B, 3C, 3D, 3E, 3F, and 3G illustrate steps in a process for multicasting a generically encoded audiovisual data stream to multiple subscribers that request to view a real-time broadcast from different content providers. The network environment 200 corresponds to the network environment 200a described herein with reference to FIG. 2A and includes the other components described with respect to FIG. 2A, thus the components will not be described here again for the sake of conciseness.

Figure 3A:
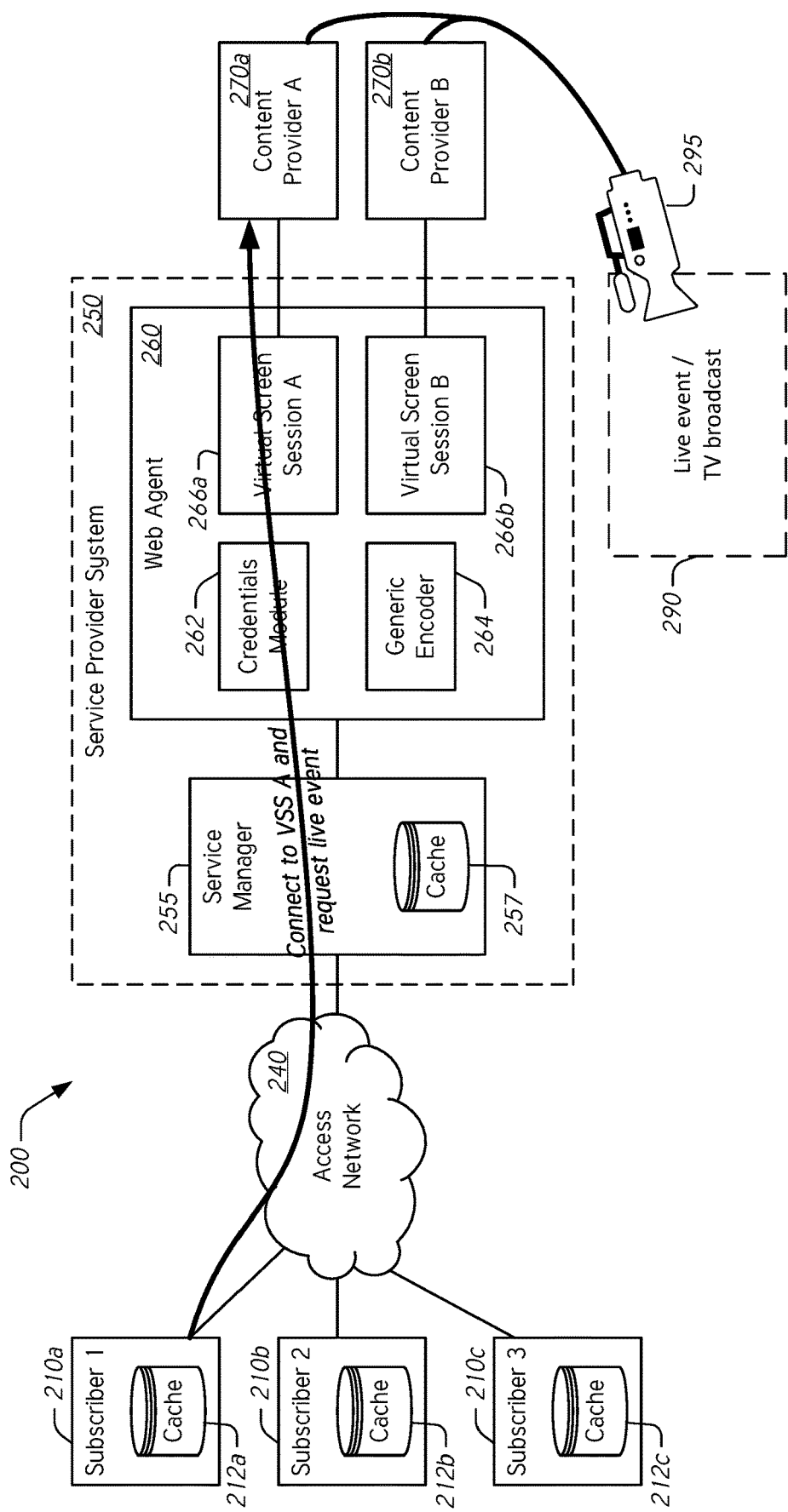
FIGS. 3A, 3B, 3C, 3D, 3E, 3F, and 3G illustrate steps in a process for multicasting a generically encoded audiovisual data stream to multiple subscribers that request to view a real-time broadcast from different content providers.

FIG. 3A illustrates a first subscriber 210a connecting to the web agent 260 to request to view a real-time broadcast 290 of a live event from a first content provider 270a. The connection to the content provider 270a is accomplished through the virtual screen session 266a which uses the subscriber's credentials from the credential module 262 to authorize access to the requested real-time broadcast 290 using the first content provider 270a. In some embodiments, the virtual screen session 266a achieves authorization and access to the first content provider 270a by instantiating a virtual browser or a virtual device that acts as a user accessing the content provider's interface (e.g., a website or application). Thus, the content provider 270a is provided an expected interface to provide the requested audiovisual data stream of the real-time broadcast 290 (e.g., the content provider 270a can stream the requested real-time broadcast 290 to the virtual browser).

Figure 3B:
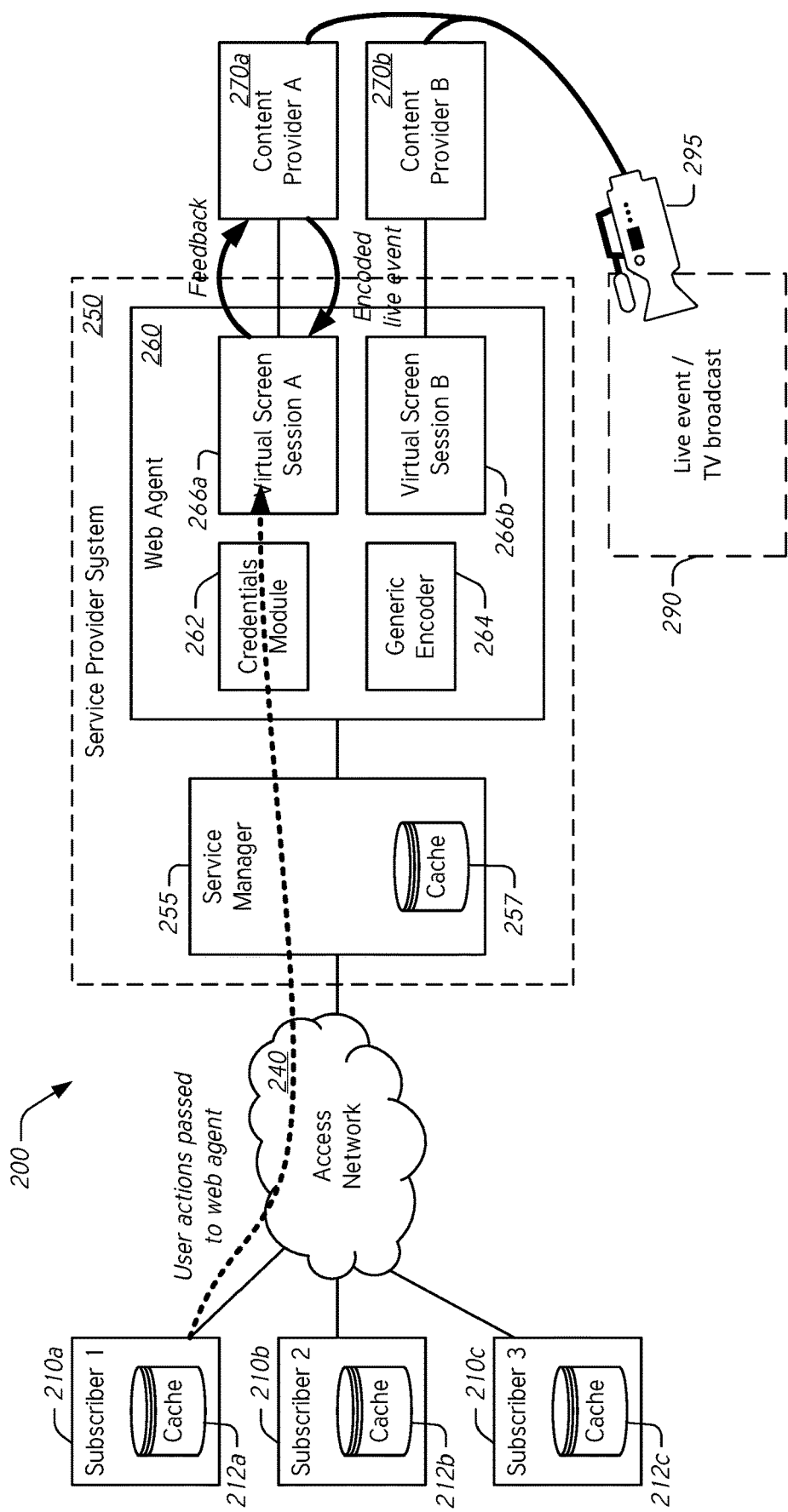

FIG. 3B illustrates the content provider 270a streaming the audiovisual data to the web agent 260 using the virtual screen session 266a. The content provider 270a receives feedback from the virtual screen session 266a corresponding to user actions that are passed to the virtual screen session 266a through the web agent 260. As the virtual screen session 266a receives frames of the audiovisual data in the encoding implemented by the first content provider 270a, the virtual screen session 266a utilizes an embedded browser or the like to render the audiovisual data. Rendering includes decoding the encoded media object into a playable version. As the virtual screen session 266a renders the audiovisual data in the embedded browser of the virtual screen session 266a, the virtual screen session 266a produces and provides to the first content provider 270a the feedback (e.g., user interactions) the first subscriber 210a produces and provides. The web agent 260 is thus transparent to the content provider 270a.

Figure 3C:
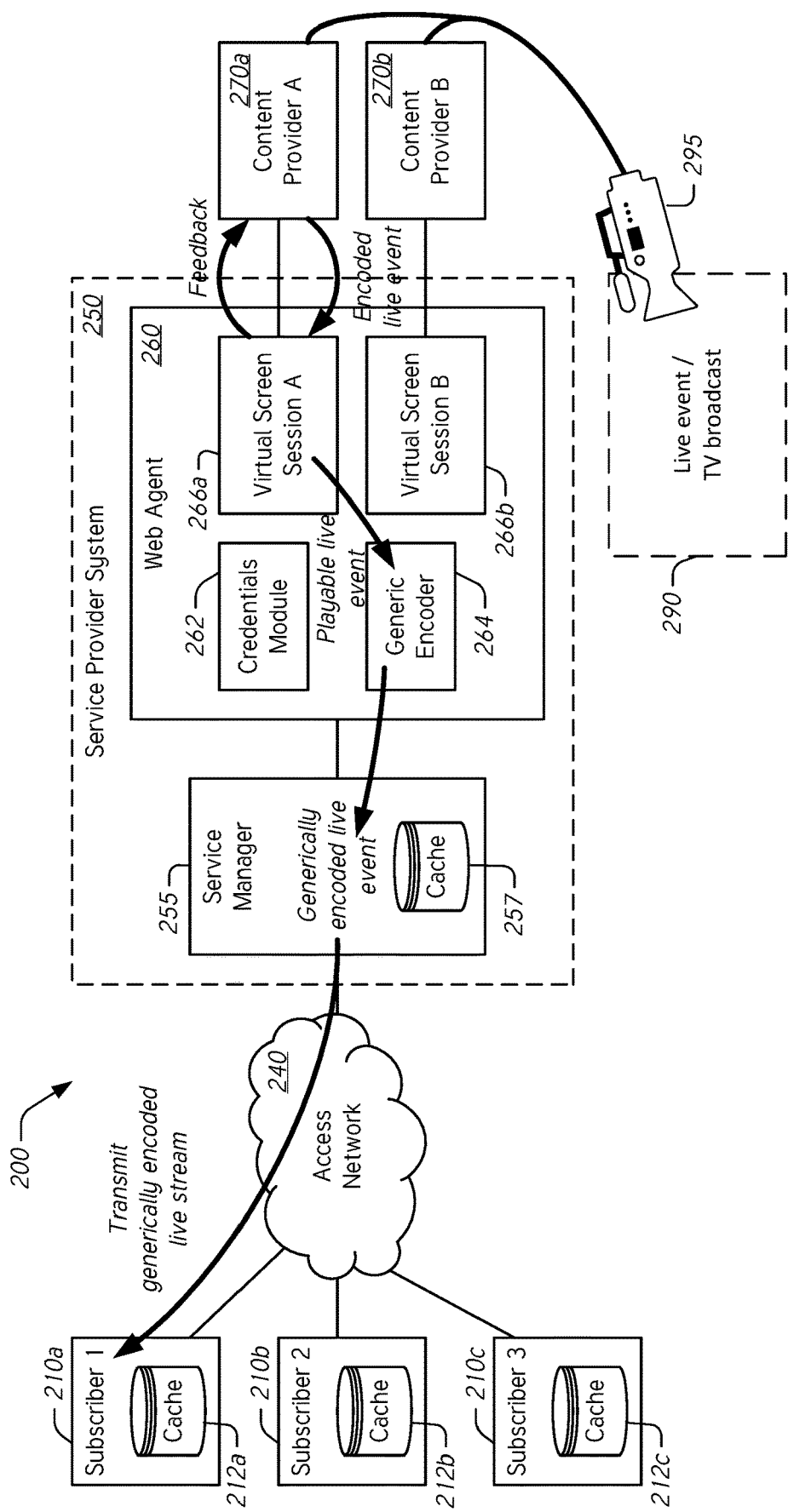

FIG. 3C illustrates the web agent 260 re-encoding the playable version of the audiovisual data stream using the generic encoder 264 to provide a generically encoded audiovisual data stream. The generically encoded audiovisual data stream is transmitted to the service manager 255 and transmitted to the requesting subscriber 210a, who then plays the generically encoded audiovisual data stream. This rendering and re-encoding of the audiovisual data stream continues while the first subscriber 210a watches the real-time broadcast 290.

Figure 3D:
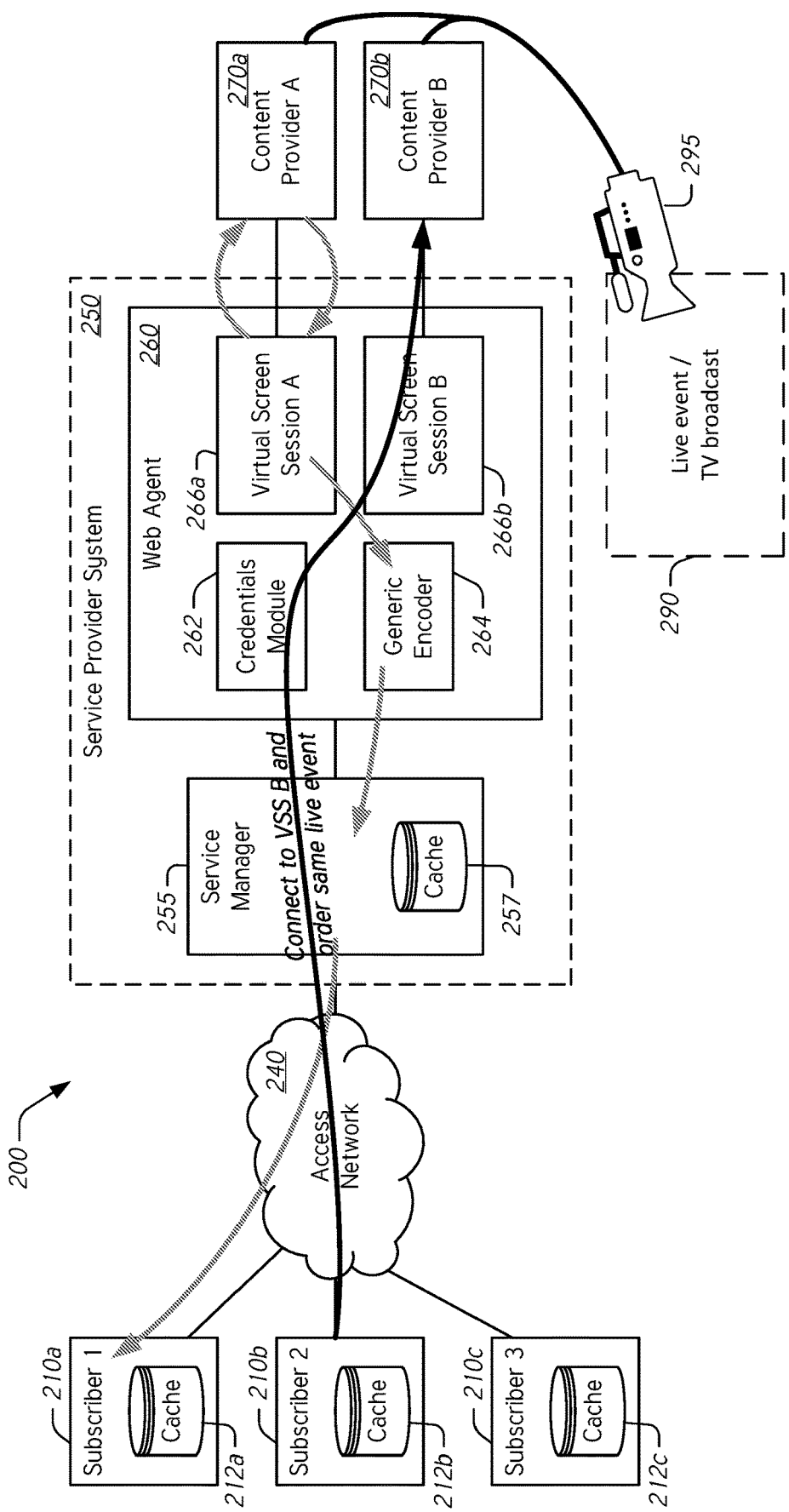

FIG. 3D illustrates the second subscriber 210b connects to the web agent 260 and requests to view the same real-time broadcast 290 (e.g., the live event) as the first subscriber 210a, but from the second content provider 270b. The web agent 260 determines that the second subscriber 210b is authorized to access the live event from the second content provider 270. The connection to the second content provider 270b is accomplished through the virtual screen session 266b which uses the subscriber's credentials from the credential module 262 to authorize access to the requested live event from the second content provider 270b. The virtual screen session 266b can achieve authorization and access to the second content provider 270b by instantiating a virtual browser or a virtual device that acts as a user accessing the content provider's interface (e.g., a website or application). Thus, the second content provider 270b is provided an expected interface to provide the requested audiovisual data stream (e.g., the content provider 270b can stream the requested live event to the virtual browser). This occurs in parallel with the process described in FIG. 3C, namely the rendering and re-encoding of the audiovisual data stream from the first content provider 270a, as illustrated by the grey arrows in FIG. 3D.

Figure 3E:
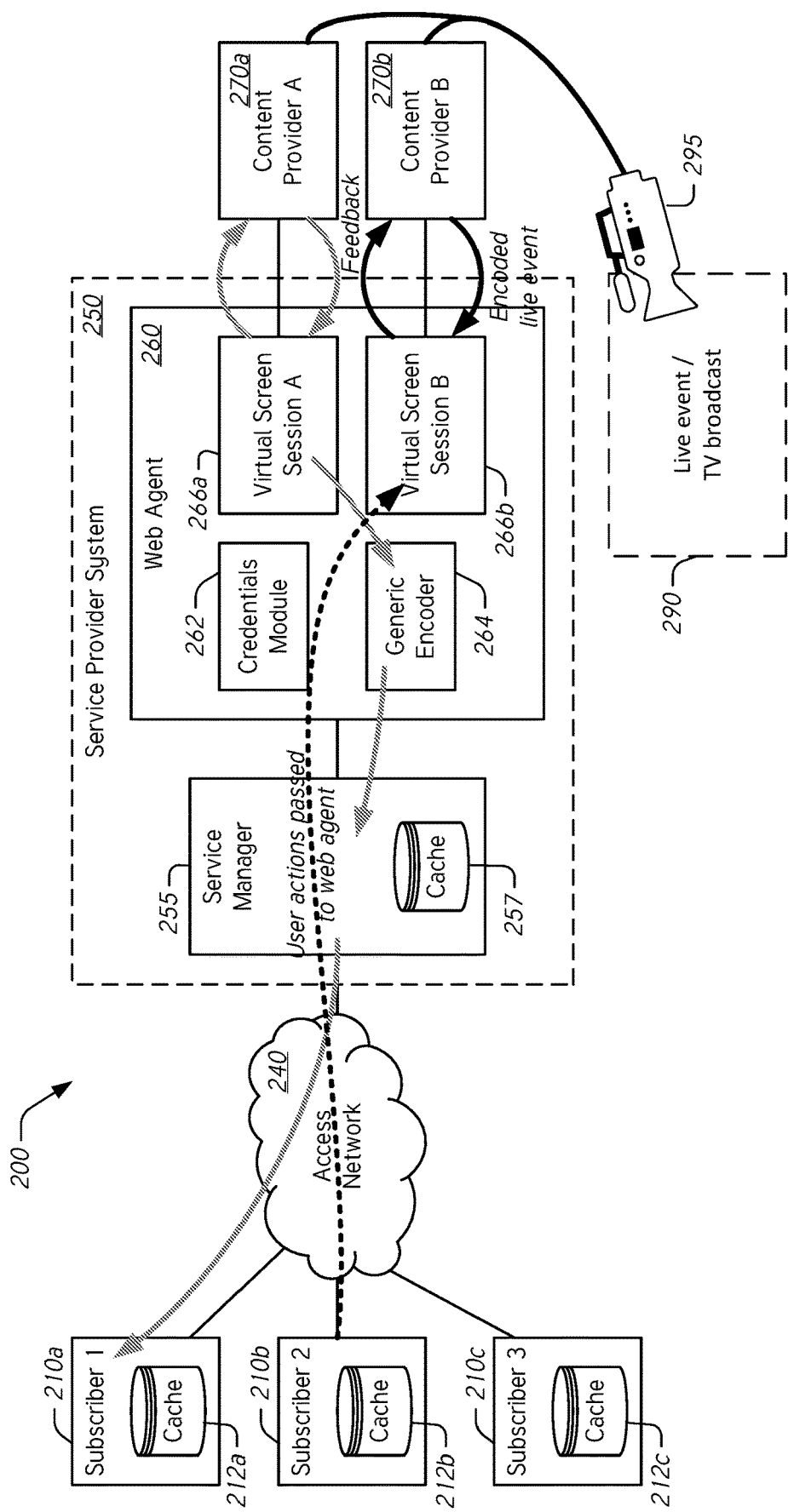

FIG. 3E illustrates the second content provider 270b streaming the live event to the web agent 260 using the virtual screen session 266b. The second content provider 270b receives feedback from the virtual screen session 266b corresponding to user actions that are passed to the virtual screen session 266b through the web agent 260. As the virtual screen session 266b receives frames of the audiovisual data stream in the encoding implemented by the second content provider 270b, the virtual screen session 266b utilizes the virtual browser to render the audiovisual data stream. Rendering includes decoding the encoded media object into a playable version. As the virtual screen session 266b renders the audiovisual data stream in the virtual browser, the virtual screen session 266b produces and provides to the second content provider 270b the feedback (e.g., user interactions) the second subscriber 210b produces and provides. The web agent 260 is thus transparent to the second content provider 270b.

Figure 3F:
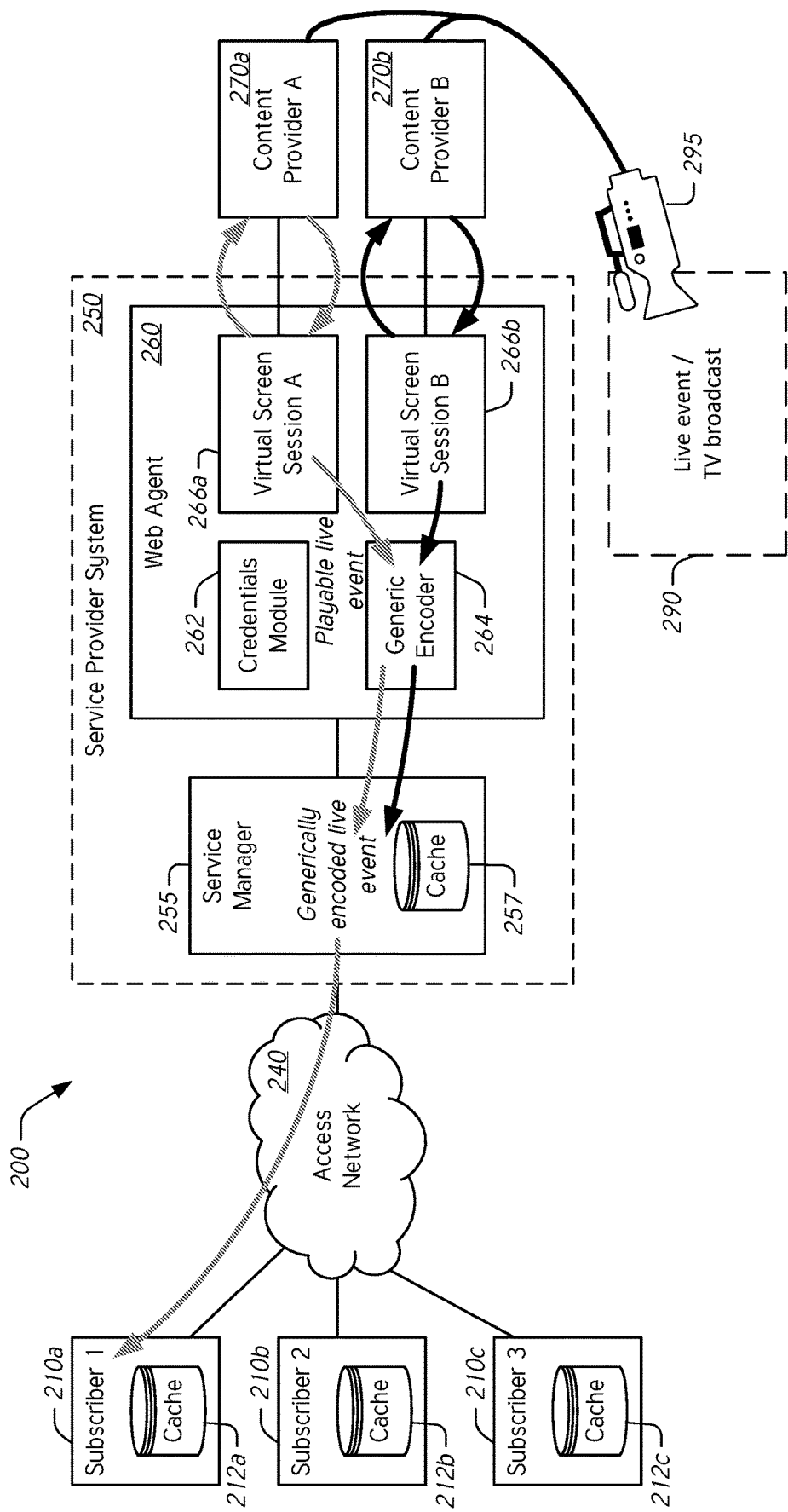

FIG. 3F illustrates the web agent 260 re-encoding the playable version of the audiovisual data stream using the generic encoder 264 to provide a generically encoded audiovisual data stream. The generically encoded audiovisual data stream is transmitted to the service manager 255. Again, this happens in parallel with the virtual screen session 266a, corresponding to the first content provider 270a, rendering the audiovisual data stream from the first content provider 270a and re-encoding it to generate the generically encoded audiovisual data stream from the live event streamed from the first content provider 270a.

Figure 3G:
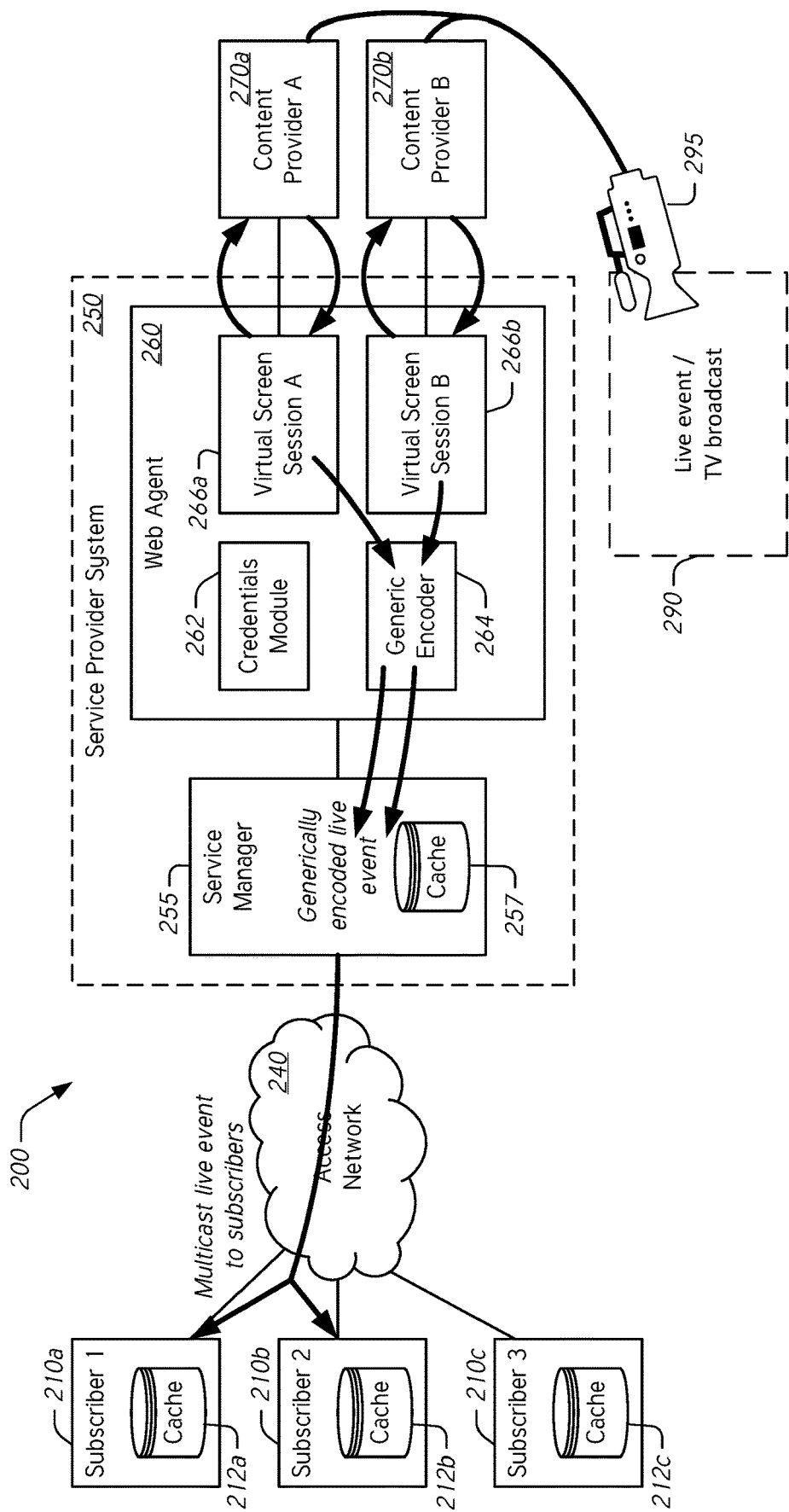

FIG. 3G illustrates that the service manager 255 determines that the generically encoded audiovisual data stream from the second content provider 270b is the same real-time broadcast as the generically encoded audiovisual data stream from the first content provider 270a. Examples of techniques for making this determination include matching metadata, checksums, content-identifying information (e.g., fingerprints), or other distinguishing characteristics of the generically encoded audiovisual data stream from the second content provider 270b to characteristics of other generically encoded audiovisual data streams provided by the web agent 260 (such as the generically encoded audiovisual data stream from the first content provider 270a). Having determined that the second subscriber 210b requested to view the same live event as the first subscriber 210a, the service manager 255 multicasts the generically encoded audiovisual data stream to the first and second subscribers 210a, 210b, who each then play the generically encoded audiovisual data stream.

While viewing the real-time broadcast, the subscribers 210a, 210b may continue to interact with the client software, such as to pause, rewind, etc., the content. As discussed herein, such commands may be sent to the web agent 260, which may then input corresponding commands into the respective virtual screen sessions 266a, 266b to provide feedback to the content provider 270a, 270b regarding the manner in which the subscriber is viewing the content. For example, if the user inputs a "pause" command via the user interface for the client software, the client software may pause playback of the content, while also transmitting to the web agent 260 information indicating that the user has paused the content. The web agent 260 may then provide an input to the corresponding virtual screen session to cause a pause command to be transmitted to the content provider.

Figure 4:
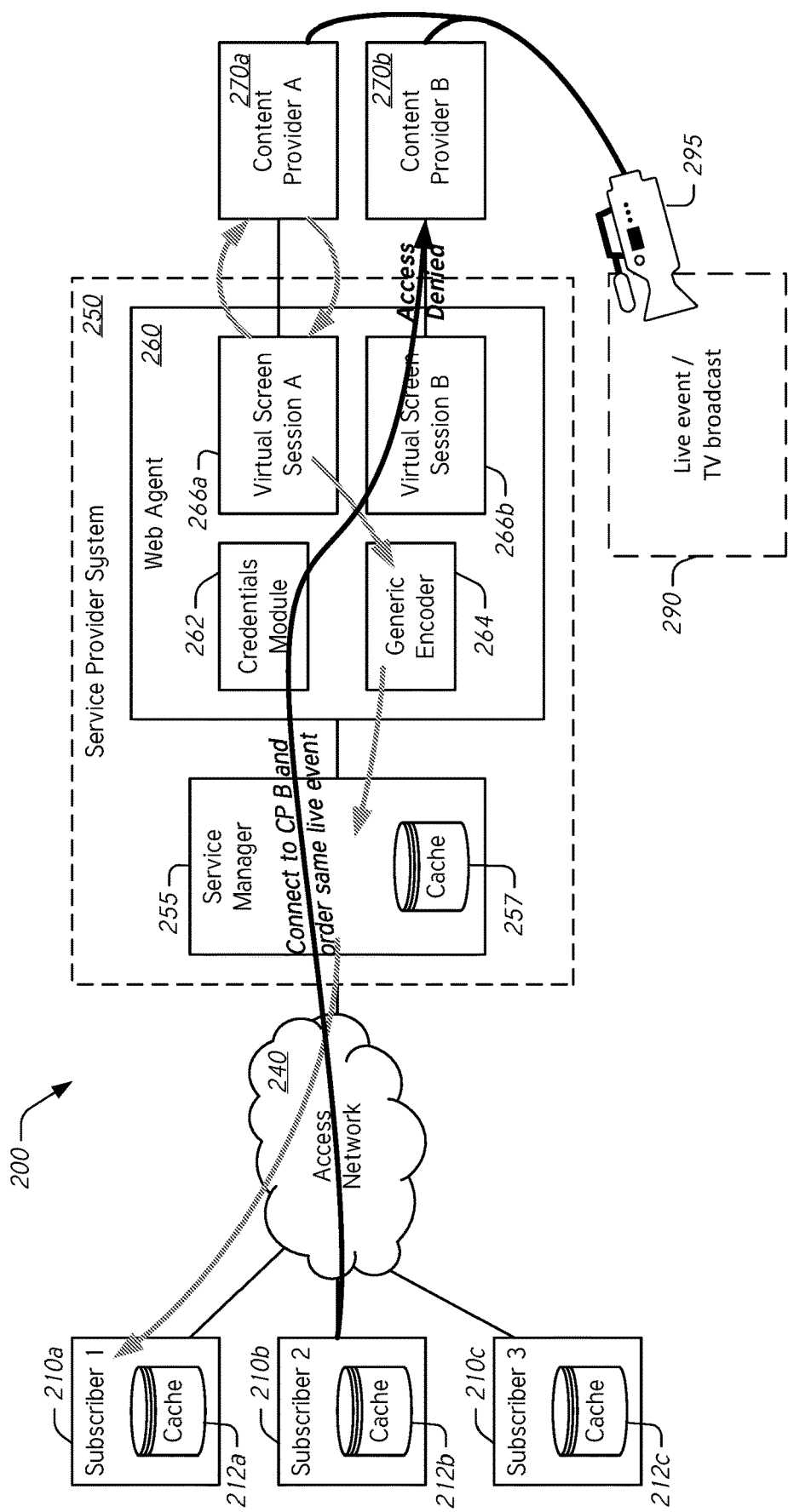
FIG. 4 illustrates variations of steps in the process of FIGS. 3A-3G.

FIG. 4 illustrates variations of steps in the process of FIGS. 3A-3G. For example, if the second subscriber 210b cancels or otherwise loses their subscription to the second content provider 270b, the web agent 260 discovers that the second subscriber's credentials are no longer valid. The web agent 260 may then abort the process above and send the second subscriber 210b an error message. Thus, the web agent 260 and service provider system 250 are configured to prevent unauthorized viewing of multicast audiovisual data streams. The web agent 260 can be configured to require authorization verification prior to multicasting an audiovisual data stream to a subscriber.

In some embodiments, the web agent 260 can verify that the second subscriber 210b is authorized to access the live event from any of the content providers using the credentials module 262. If the second subscriber 210b is not authorized, the service manager 255 can determine to not multicast the generically encoded audiovisual data stream to the second subscriber 210b. In some embodiments, this process can be accomplished by the web agent 260 rather than the service manager 255 or this process can be accomplished by the web agent 260 where the service manager is implemented as part of the web agent 260.

Figure 5A:
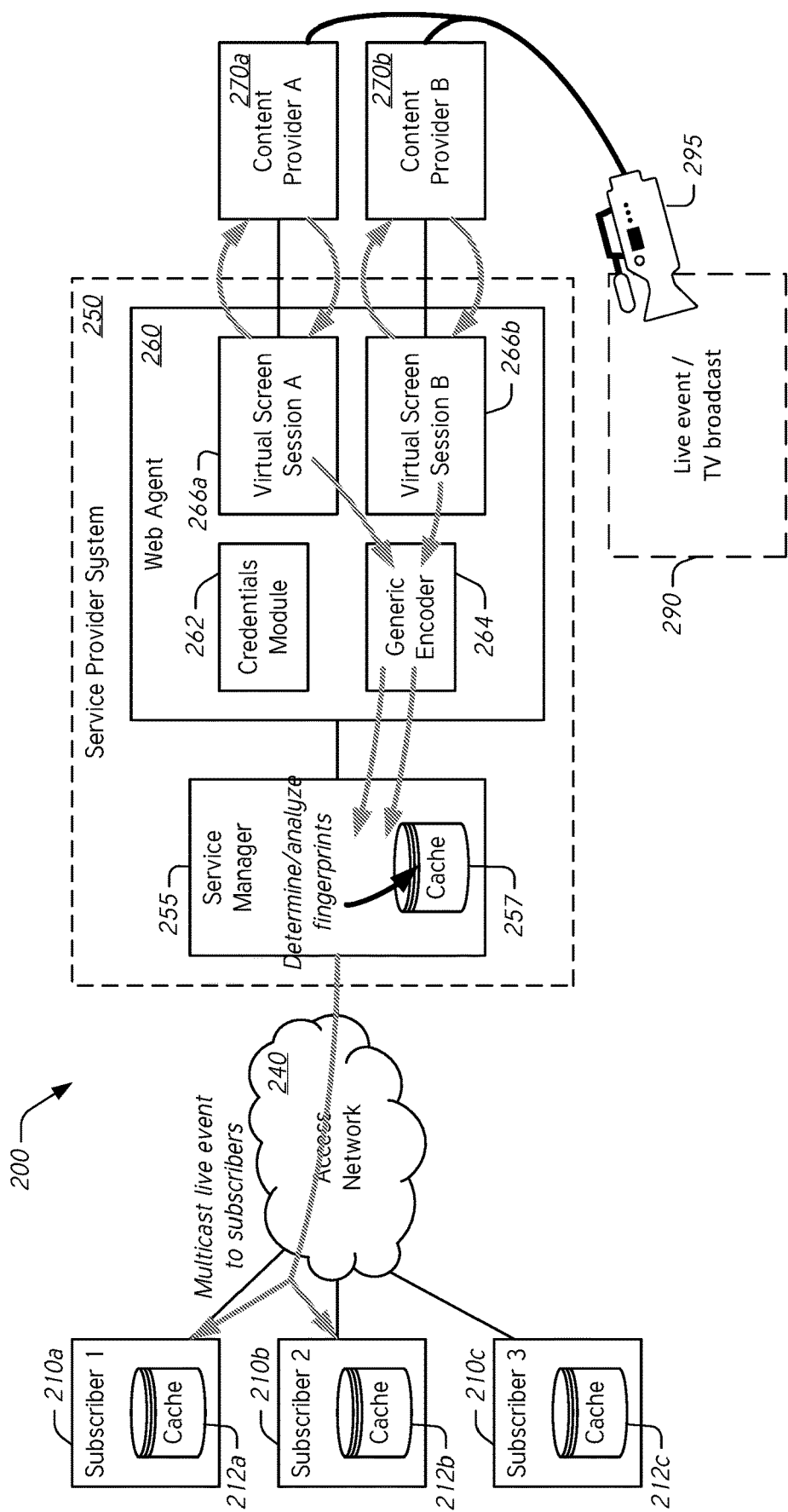
FIG. 5A illustrates other variations of steps in the process of FIGS. 3A-3G.

FIG. 5A illustrates other variations of steps in the process of FIGS. 3A-3G. Between the process steps described with respect to FIGS. 3F and 3G, the service manager 255 can be configured to determine fingerprints or other characterizations of each generically encoded audiovisual data stream or of portions (e.g., chunks) of each generically encoded audiovisual data stream. As used herein, the term fingerprint can refer to any suitable process of generating content-identifying information that corresponds to the content of audiovisual data. A goal of generating such information is to identify where a piece of content sent through different content providers is the same content. This does not require the pieces of content from the different content providers be bitwise identical. Using determined fingerprints, the service manager 255 can be configured to determine whether the individual generically encoded audiovisual data streams represent the same real-time broadcast. In some embodiments, the fingerprints are stored in the cache 257 for comparison with previous audiovisual data streams. Metadata can also be extracted and stored in the cache 257. Other methods of comparison can be used as well, including metadata analysis, user action analysis (e.g., tracking user interaction with the content provider's interface to determine what content was requested), subscriber request analysis (e.g., whether the subscribers requested to watch the same channel on different content providers), etc.

For live content, these fingerprints may be generated throughout the course of receiving the content and may be stored temporarily or permanently. While live broadcasts may be time-delayed and different content providers may use different time delays, content fingerprints may be stored for a sufficient duration to enable content streams from different content providers to be identified and matched. As additional fingerprints are created, aging fingerprints can be discarded or overwritten by new fingerprint data.

Figure 5B:
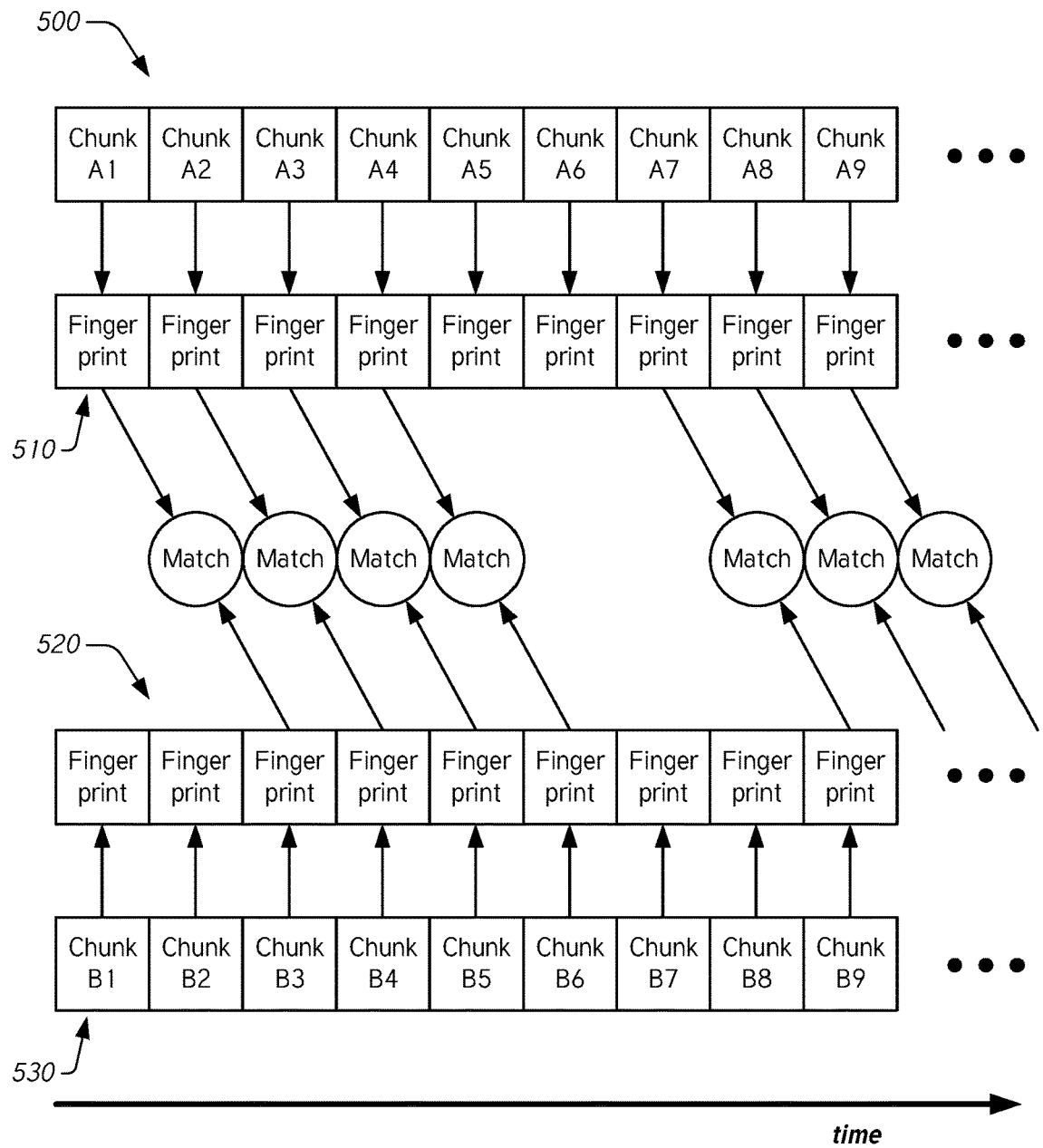
FIG. 5B illustrates an example of comparing fingerprints from different audiovisual data streams corresponding to content requested by two different subscribers.

FIG. 5B illustrates an example of comparing fingerprints from different audiovisual data streams 500, 530 corresponding to content requested by subscriber A (data stream 500) and content requested by subscriber B (data stream 530). The audiovisual data streams 500, 530 are divided into chunks and a fingerprint 510, 520 or other characterization is determined for each chunk. Where the fingerprints of two chunks are sufficiently similar, the service manager 255 can determine that the corresponding chunks are from the same real-time broadcast. Where the fingerprints of the two chunks are sufficiently dissimilar, the service manager 255 can determine that the corresponding chunks are from different broadcasts. Further description and examples of computing and comparing fingerprints are provided herein, with particular examples being described with reference to FIG. 8 and the method 800.

In some embodiments, the service manager 255 may require an exact match between two fingerprints. In some implementations, such as implementations employing machine learning techniques, a probability may be generated to represent the likelihood that a candidate fingerprint matches another fingerprint. If the probability meets or exceeds a threshold, the service manager 255 may determine there is a match. Based on one or more candidate fingerprints from a first audiovisual data stream matching the fingerprints of a second audiovisual data stream, the service manager 255 determines that the second audiovisual data stream represents the same content as the first audiovisual data stream. Alternatively (or in addition), the service manager 255 may compare metadata associated with each audiovisual data stream to determine whether the data streams correspond to the requested real-time broadcast.

In the example of FIG. 5B, the first audiovisual data stream has chunks A1-A4 that correspond to chunks B3-B6 of the second audiovisual data stream. As a result, chunks A1-A4 (that are generically encoded) are multicast to subscriber A and subscriber B. Similarly, the first audiovisual data stream has chunks A7- . . . that correspond to chunks B9- . . . of the second audiovisual data stream. As a result, chunks A7- . . . (that are generically encoded) are multicast to subscriber A and subscriber B. Where the chunks are sufficiently dissimilar, the chunks can be transmitted to the requesting subscriber (e.g., chunks A5, A6 to subscriber A and chunks B1, B2, B7, B8 to subscriber B).

In some embodiments, where individual audiovisual data streams correspond to one another for a period, then do not correspond to each other for another period, and then resume correspondence, it may be inferred that the real-time broadcast includes commercials that are different or unique to individual content providers. Thus, subscribers watching the same real-time broadcast from different content providers may have portions of the generically encoded audiovisual data streams that differ from one another. These portions can be transmitted to the subscribers and stored at the subscriber (e.g., using cache 212a-212c) and/or at the service manager 255 (e.g., using cache 257). This may be beneficial due to commercials often being repeated during relatively long events or broadcasts. In such instances, the service manager 255 can use fingerprint information to determine that a commercial has been transmitted to a subscriber previously and can instruct the subscriber to play the commercial from its cache rather than re-transmitting the commercial to the subscriber. Thus, in FIG. 5B, the dissimilar chunks (e.g., chunks A5, A6, B1, B2, B7, B8) are flagged as potentially being commercials or advertisements. If similar chunks are seen in the future, the service manager 255 can reference its cache 257 to determine whether the commercial has been seen before.

Figure 6:
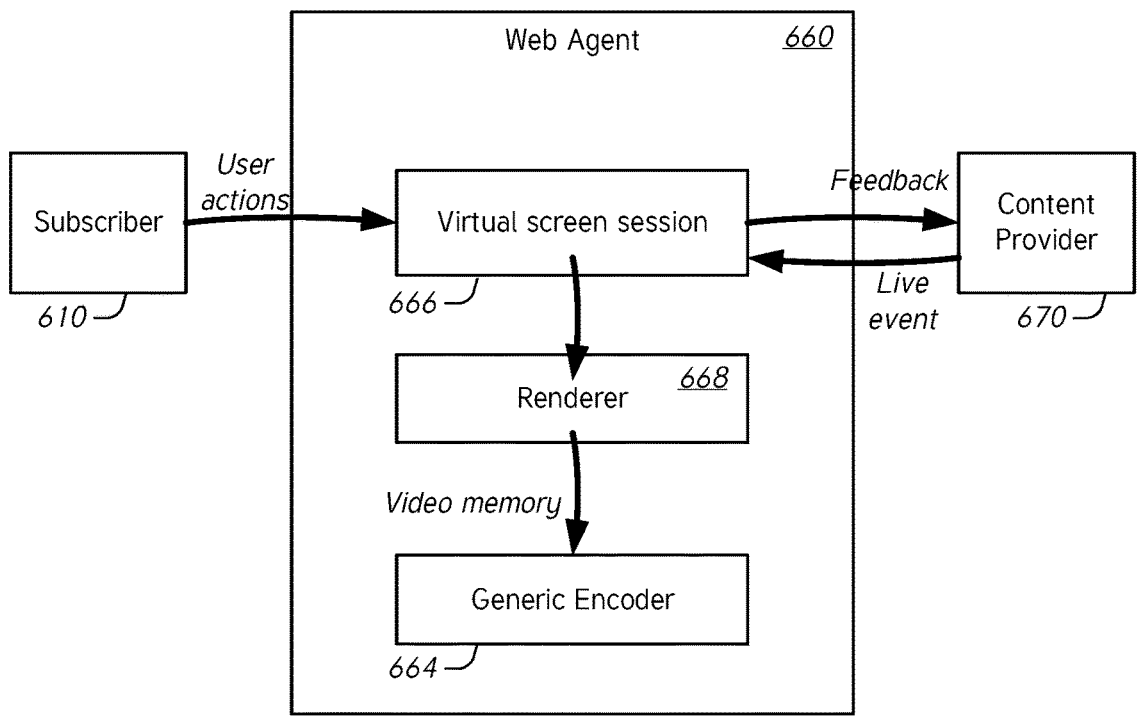
FIG. 6 illustrates a block diagram of an example process performed by a web agent to generically encode an audiovisual data stream.

FIG. 6 illustrates a block diagram of an example process performed by a web agent 660 to generically encode an audiovisual data stream. The web agent 660 is similar to the web agents 160, 260 described herein with reference to FIGS. 1-5. The web agent 660 is communicatively coupled to a subscriber 610 through an access network (not shown) as described herein and to a content provider 670 on the Internet as described herein. The web agent 660 includes a virtual screen session 666, similar to the virtual screen sessions 266 described herein with reference to FIGS. 2-5. The virtual screen session 666 includes hardware and software functionality to instantiate a virtual browser or virtual device and includes hardware and software functionality to render audiovisual content with a renderer 668 using the visual browser or device. The web agent 660 includes a generic encoder 664 similar to the generic encoder 264 described herein with reference to FIGS. 2-5.

The web agent 660 is configured to run an instance of a specific application and/or a browser accessing a specific website corresponding to the application or website of the content provider 670. Content provided from the content provider 670 typically includes two layers of encryption: a content delivery network layer (CDN) such as HTTPS and a digital rights management (DRM) layer. The web agent 660 would typically be unable to access content from the content provider due at least in part to the layers of encryption. Thus, the web agent 660 is configured to access content through the content provider 670 based on access rights and authorization of the subscriber 610. The web agent 660 is thus limited to access to a similar degree as the subscriber 610. The web agent 660 is configured to provide credentials from the subscriber 610 to the content provider 670 to verify that the subscriber 610 has sufficient rights to access the requested real-time broadcast. This is done when the subscriber 610 requests access to the content from the content provider 670. Thus, the web agent 660 operates at an application layer to deal with access controls applied by the content provider 670 rather than attempting to deal with the access controls at the content delivery network (CDN) layer.

The web agent 660 instantiates a virtual screen session 666 with a virtual browser or other virtual application or device running in the virtual screen session 666. The web agent 660 thus is able to proxy all of the actions the subscriber takes and pass it on to the content provider 670. This also allows the web agent 660 to render the audiovisual data stream and put it into video memory, which in turn enables the generic encoder 664 to create a generically encoded audiovisual data stream. The generically encoded audiovisual data stream can include some encryption or access control specific to the web agent 660 or ISP. However, the generic encoder 664 can be configured to remove the content provider's CDN encryption and/or DRM encryption or security, replacing it with the ISP's own encryption.

The subscriber 610 interacts with an application or website that proxies the subscriber's actions for the web agent 660. The application or website is provided by the ISP and can be configured to mimic the content provider's application or website. The web agent 660 provides transparency between the content provider 670 and the subscriber 610 by providing the user's actions to the content provider 670 and by providing the audiovisual data stream from the content provider 670 to the subscriber 610. Actions that can be sent to the content provider through the virtual screen session 666 include mouse movements, mouse hovers, clicks or other interactions with the application or website, play, pause, rewind, fast forward, skip, click off, resume in the future, etc. The web agent 660 and virtual screen session 666 are configured to execute customized software to enable the subscriber 610 to access content provided by the content provider 670 without directly using software, e.g., client software, supplied by the content provider 670. For example, the subscriber 610 may ordinarily access the content provider 670 using the content provider's software client. Instead, the software client is executed by the virtual screen session 666 and the subscriber 610 executes a software client provided by the ISP. Thus, when a subscriber uses the ISP's software client to access the content provider 670, the ISP software client sends commands to the web agent 660 to access that content provider. The web agent 660 receives that command and runs the appropriate software client and sends commands to the content provider 670. Thus, it appears to the subscriber 610 that they are running the content provider's software client and interacting with it, even though interactions with the content provider 670 are actually handled by the web agent 660 based on commands sent from the ISP software client on the subscriber's device.

When the subscriber 610 selects content to watch, the selection is sent from the ISP software client at the subscriber's device to the web agent 660, which then makes the selection using the virtual screen session 666. The selection is sent to the content provider 670, which then begins streaming the selected content to the virtual screen session 666. The virtual screen session 666 receives the streamed content and decodes it using the virtual application (e.g., browser) running in the virtual screen session 666. The web agent 660 then renders the decoded data as video frames using the renderer 668. The generic encoder 664 captures the rendered video frames and re-encodes them. The re-encoded rendered video frames can then be multicast to the subscriber 610 and other subscribers of the ISP. The subscriber 610 can use the ISP software client to watch the media object.

The web agent 660 is configured to operate so that it appears that the subscriber 610 is interacting with the content provider's software client. The subscriber 610 may browse the content available from the content provider 670 and select content to view. Commands entered by the subscriber 610 are transmitted to the web agent 660 and used to send commands to the content provider 670, such as to select content to view. These content control commands may include commands used during playback of content, such as pause, rewind, fast forward, skip commands, etc. Each of these content control commands may then be sent to the web agent 660, which may generate a corresponding input to the content provider's software client running in the virtual screen session 666. However, it should be appreciated that the content control commands may be affected locally, e.g., a pause command, even if the content control commands are also sent to the service provider. Thus, the subscriber 610 may immediately experience the pausing of the content, even if the content control command does not reach the content provider 670 immediately. As discussed herein, providing subscriber 610 actions to the content provider 670 may enable the content provider 670 to determine viewing statistics or other information about viewer engagement with its content.

In some embodiments, where multiple subscriber are each accessing a particular content provider, the web agent 660 may execute a corresponding number of instances of the content provider's software client, one for each subscriber. Similarly, the web agent 660 may instantiate a corresponding number of virtual screen sessions 666, one for each subscriber.

Web Agent Hardware

Figure 7:
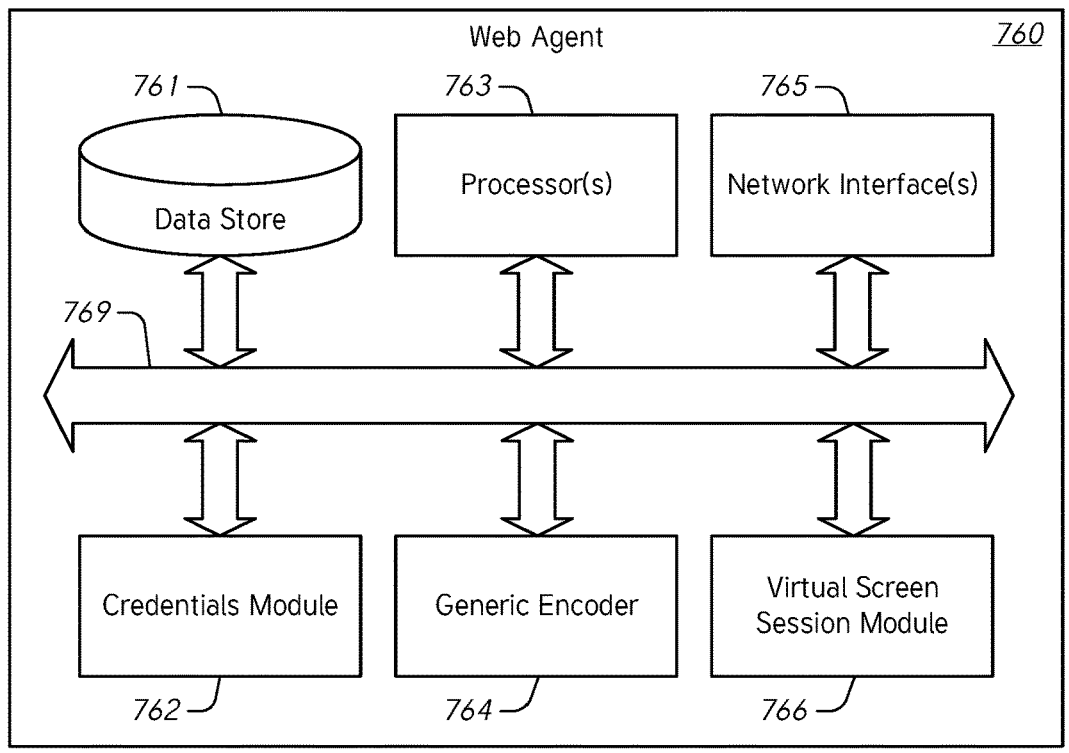
FIG. 7 illustrates a block diagram of an example web agent.

FIG. 7 illustrates a block diagram of an example web agent 760. The web agent is similar to the web agents 160, 260, 660 described herein with reference to FIGS. 1-6 and can be implemented in the network environments there described. The web agent 760 is configured to generate generically encoded audiovisual data streams from a plurality of content providers to enable multicasting of a single generically encoded audiovisual data stream for each real-time broadcast transmitted over a network to subscribers, thereby reducing bandwidth consumption. The web agent 760 can employ any method described herein for reducing bandwidth consumption using generically encoded audiovisual data streams, such as the example methods 800, 900 described herein with reference to FIGS. 8, 9A, and 9B.

The web agent 760 can include hardware, software, and/or firmware components for rendering audiovisual data, encoding audiovisual data streams, generating content-identifying information (e.g., fingerprinting) for audiovisual data streams, proxying websites and applications for subscribers, authorizing access to audiovisual data streams, and the like. The web agent 760 can include a data store 761, one or more processors 763, network interfaces 765, a credentials module 762, a generic encoder module 764, and a virtual screen session module 766. Components of the web agent 760 can communicate with one another, with external systems, and with other components of a network using communication bus 769. The web agent 760 can be implemented using one or more computing devices. For example, the web agent 760 can be implemented using a single computing device, multiple computing devices, a distributed computing environment, or it can be located in a virtual device residing in a public or private computing cloud. In a distributed computing environment, one or more computing devices can be configured to provide the modules described herein to provide the described functionality. The web agent 760 can be implemented as part of an ISP network environment or as a service provided by systems not directly operated or controlled by the ISP (e.g., as a service implemented in a cloud platform).

The web agent 760 includes the credentials module 762. The credentials module 762 is configured to provide subscriber authentication credentials (e.g., username and password) to content providers to enable access to real-time broadcasts provided by the content providers. The credentials module 762 can receive a request from a subscriber to watch a real-time broadcast and the credentials module 762 can authenticate access to the real-time broadcast.

The web agent 760 includes the generic encoder module 764. The generic encoder module 764 is configured to generate generically encoded audiovisual data from rendered audiovisual data streams. The generic encoder module 764 is configured to extract audiovisual data from video memory and to create encoded audiovisual data streams using a generic encoding that may or may not include encryption or other such access controls.

The web agent 760 includes the virtual screen session module 766. The virtual screen session module 766 is configured to instantiate a virtual screen session for individual subscribers and individual content providers. A particular instance of a virtual screen session is configured to provide a virtual browser, virtual application, and/or virtual device to interface with a particular content provider. The virtual screen sessions may be configured to pass user actions through to the content provider. This can be accomplished by mirroring or repeating user actions in an instantiated virtual screen session. The virtual screen sessions instantiated by the virtual screen session module 766 are configured to render audiovisual data streams provided by content providers, effectively removing encryption layers such as CDN and DRM. The virtual screen sessions use a renderer to put audiovisual data into video memory for the generic encoder module 764.

In some embodiments, the first time the web agent 760 encounters an audiovisual data stream for a real-time broadcast, it is configured to generate a fingerprint of the audiovisual data stream and/or fingerprints of chunks of the audiovisual data stream. As used herein, the term fingerprint can refer to any suitable process of generating content-identifying information that corresponds to the content of audiovisual data. A goal of generating such information is to identify where a piece of content sent through different content providers is the same content. This does not require the pieces of content from the different content providers be bitwise identical. The web agent 760 is also configured to re-encode the audiovisual data stream using a generic encoding scheme to enable any suitable subscriber of the ISP to watch the audiovisual data stream with suitable authorization. The web agent 760 is also configured to send the generically encoded audiovisual data stream to the subscriber that requested the real-time broadcast and/or to multicast the generically encoded audiovisual data stream to all the subscribers that requested the real-time broadcast.

In some embodiments, the second time the web agent 760 encounters the same real-time broadcast, it is configured to compute a fingerprint of the audiovisual data stream and/or fingerprints of chunks of the audiovisual data stream. If the web agent 760 recognizes that the generically encoded version of the audiovisual data stream is being transmitted to a particular subscriber, it is configured to multicast the generically encoded audiovisual data stream to each subscriber requesting the same real-time broadcast. For each additional audiovisual data stream corresponding to the same real-time broadcast, the web agent 760 is configured to add the subscriber to the list of subscribers receiving the multicast generically encoded audiovisual data stream.

In certain embodiments, the fingerprints can be calculated by the generic encoder as it encodes the audiovisual data stream and/or after it has been generically encoded. The fingerprints are configured to enable identification of identical audiovisual data streams without necessarily being byte accurate. This is because the generically encoded audiovisual data stream can be generated from a first encoding provided by a first content provider while a current audiovisual data stream is being generated from a second encoding provided by a second content provider. Even where the audiovisual data stream is the same real-time broadcast (e.g., the same live event), the different encodings applied by the content providers result in different data streams so that they are not byte-by-byte identical. Thus, the fingerprinting is configured to identify audiovisual data streams that are the same without comparing them byte-for-byte.

The web agent 760 includes one or more network interfaces 765 to interface with one or more access networks and the Internet. The web agent 760 includes one or more processors 763 that are configured to control operation of the modules 762, 764, 766 and the data store 761. The one or more processors 763 implement and utilize the software modules, hardware components, and/or firmware elements configured to access, render, and generically encode audiovisual data streams. The one or more processors 763 can include any suitable computer processors, application-specific integrated circuits (ASICs), field programmable gate array (FPGAs), or other suitable microprocessors. The one or more processors 763 can include other computing components configured to interface with the various modules and data stores of the web agent 760.

The web agent 760 includes the data store 761 configured to store configuration data, device data, databases, data tables, algorithms, executable instructions (e.g., instructions for the one or more processors 763), and the like. The data store 761 can be any suitable data storage device or combination of devices that include, for example and without limitation, random access memory, read-only memory, solid-state disks, hard drives, flash drives, bubble memory, and the like. The data store 761 can be used to store generically encoded audiovisual data streams, metadata, fingerprints of audiovisual data streams, subscriber data, and the like.

Methods for Using Generically Encoded Audiovisual Data Streams

Figure 8:
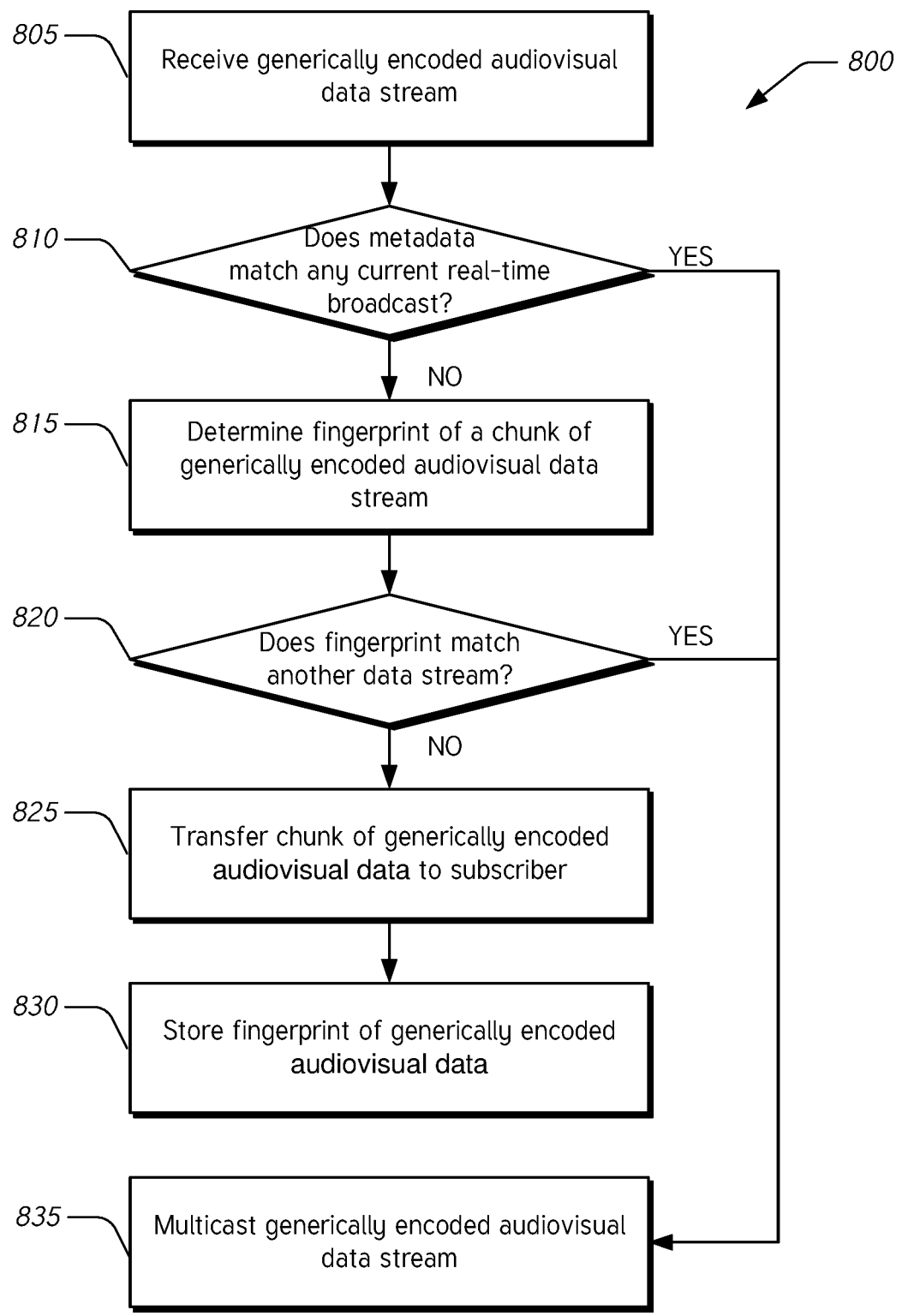
FIG. 8 illustrates a flow chart of a method for determining whether a generically encoded audiovisual data stream matches another generically encoded audiovisual data stream currently being streamed.

FIG. 8 illustrates a flow chart of a method 800 for determining whether a generically encoded audiovisual data stream matches another generically encoded audiovisual data stream currently being streamed. The method 800 can be performed by any of the service provider systems described herein with reference to FIGS. 1-7, such as the web agent 160, 260, 660, 760. For ease of description, the method 800 will be described as being performed by a service provider system. This is not to be understood to limit the scope of the disclosure. Rather, any step or portion of the method 800 can be performed by any component or combination of components of the systems described herein.

In block 805, the service provider system receives a generically encoded audiovisual data stream. The generically encoded audiovisual data stream can be generated be a generic encoder implemented in a web agent.

In block 810, the service provider system determines whether the metadata of the generically encoded audiovisual data stream matches any current real-time broadcasts being delivered to subscribers. In some embodiments, the manifest file is also compared, where the manifest file corresponds to a file that identifies the ordering of the series of chunks for playback. If so, the service provider system multicasts the generically encoded audiovisual data stream to individual subscribers viewing the real-time broadcast in block 835.

If the metadata does not match, the service provider system determines a fingerprint of a chunk of a generically encoded audiovisual data stream in block 815. The service provider system can be configured to break a media object into multi-second chunks (e.g., chunks of 2 seconds, 4 seconds, 8 seconds, etc.). A fingerprint or characteristic number can be determined for individual chunks. A fingerprint can be determined by computing a hash value or other fingerprint of one or more video frames. As used herein, the term fingerprint can refer to any suitable process of generating content-identifying information that corresponds to the content of audiovisual data. A goal of generating such information is to identify where a piece of content sent through different content providers is the same content. This does not require the pieces of content from the different content providers be bitwise identical.

In block 820, the service provider system determines whether the fingerprint matches a fingerprint of another audiovisual data stream (or chunk of a audiovisual data stream) either being delivered to a subscriber or in cache. If so, the service provider system is configured to multicast the generically encoded audiovisual data stream to individual subscribers viewing the real-time broadcast in block 835. To be considered a match, the chunks need not be bit-for-bit identical, rather it is sufficient that the chunks are sufficiently similar to be considered a match. For example, the same content obtained from multiple different content providers may different slightly, e.g., in color palettes, audio encoding algorithms, etc. However, by using downsampling or fingerprinting, such slight differences may be reduced or eliminated, enabling comparison of content from different content providers. Further, generically encoded audiovisual data streams that are fingerprinted after encoding may result in identical content having more similar fingerprints. Such a technique may help reduce the impact of different encoding schemes used by different content providers. This can be repeated for each chunk of the audiovisual data stream. A fingerprint can be compared to corresponding or nearby frames in currently streaming audiovisual data or to cached content. Such a comparison may allow the service provider system to determine the identity of a particular audiovisual data stream and then determine whether the audiovisual data stream is being delivered to one or more subscribers. Comparing fingerprints may also include content recognition which may be performed on video images using any suitable technique. For example, one or more video frames may be downsampled and one or more fingerprints may be generated and compared against other captured fingerprints of streaming audiovisual data. For audio content, a similar fingerprinting process may be used for short sampled periods, e.g., 1-10 seconds, of audio.

If the fingerprint does not match, the service provider is configured to transfer the chunk of generically encoded audiovisual data to the subscriber in block 825. In block 830, the service provider system is configured to store the fingerprint and/or chunk of generically encoded audiovisual data for future comparison. Once received content has been recognized or fingerprinted, identifying information may be stored in a data store, or existing identifying information may be updated based on the most recent recognition process. For example, updated fingerprint information or updated metadata or manifest information may be stored in the data store or merged with existing fingerprint, metadata, or manifest information. This can be used to improve real-time determinations of identical real-time broadcasts from generically encoded audiovisual data streams.

In some embodiments, audiovisual data streams are delivered with commercials or ads interspersed in the presentation. This may provide some challenges in identifying audiovisual data streams as the same real-time broadcast because commercials provided by different content providers make fingerprint matching fail during the same real-time broadcast. In such situations, the service provider system can be configured to be continuously or repeatedly determining fingerprints of audiovisual data streams being requested and streamed. If a media stream has had a sequence of matching fingerprints that is then suddenly interrupted with non-matching fingerprints, the non-matching fingerprints and the corresponding chunks can be separated out from the other audiovisual data. These can be collected to generate a data base of generically encoded ads. These can then be served in place of streaming ads where similar criteria are met, e.g., that the ads being provided by the content provider match ads that are in a subscriber's cache. This may also help to improve bandwidth utilization.

Figure 9A:
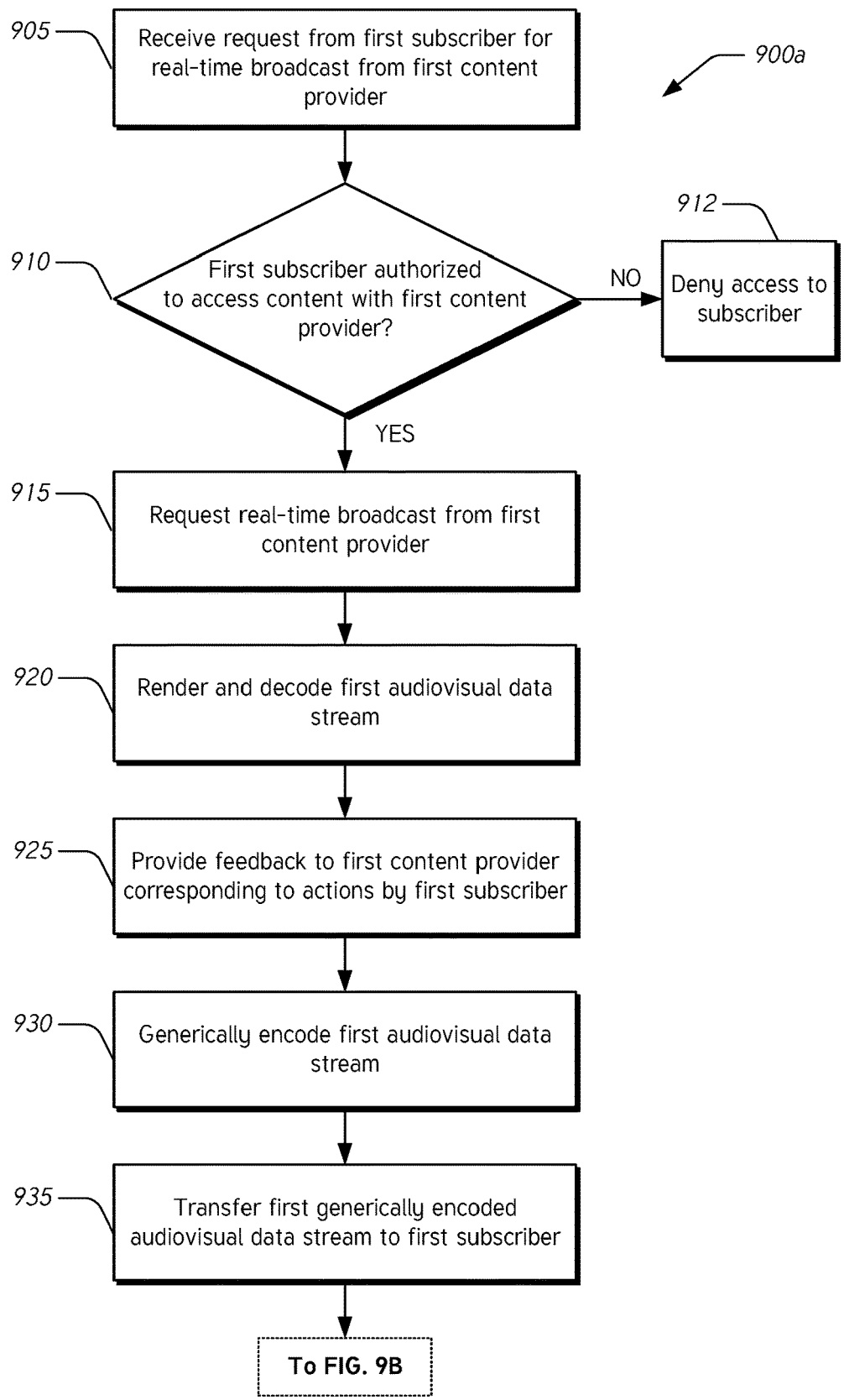
FIGS. 9A and 9B illustrate flow charts of example methods for multicasting to subscribers a generically encoded audiovisual data stream corresponding to the same real-time broadcast from different content providers.
Figure 9B:
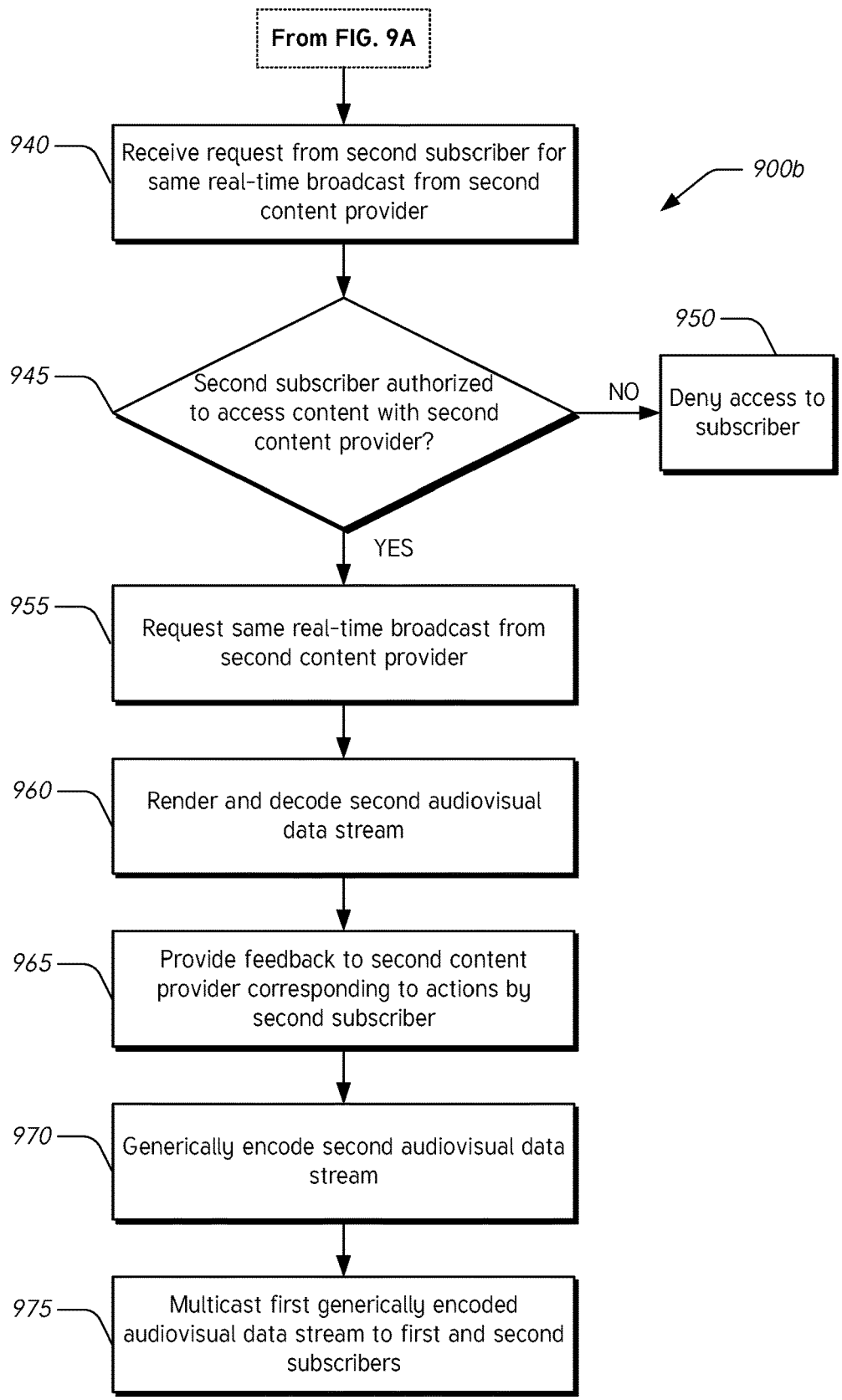

FIGS. 9A and 9B illustrate flow charts of example methods 900*a*, 900*b* for multicasting to subscribers a generically encoded audiovisual data stream corresponding to the same real-time broadcast from different content providers. The method 900 can be performed by any of the service provider systems described herein with reference to FIGS. 1-7, such as the web agent 160, 260, 660, 760. For ease of description, the method 900 will be described as being performed by a service provider system. This is not to be understood to limit the scope of the disclosure. Rather, any step or portion of the method 900 can be performed by any component or combination of components of the systems described herein.

In block 905, the service provider system receives a request from a first subscriber for a real-time broadcast from a first content provider. In block 910, the service provider system determines whether the first subscriber is authorized to access this content with the first content provider. If not, the service provider system denies access to the subscriber in block 912.

In block 915, the service provider system requests the real-time broadcast from the first content provider using a web agent. Using a virtual screen session, the service provider system renders and decodes the first audiovisual data stream provided by the first content provider, in block 920. Simultaneously, the service provider system provides feedback to the first content provider corresponding to actions by the first subscriber, in block 925.

In block 930, the service provider system generically encodes the audiovisual data stream. By using the same encoding scheme (e.g., a generic encoding scheme for all audiovisual data in the service provider system), rather than using the same encoding scheme used by the content provider, the service provider system may provide uniformly encoded content to other portions of the system, such as to a component that attempts to recognize the received content. As discussed herein, different content providers may encode content using different encoding schemes. Consequently, a real-time broadcast encoded by one content provider may appear somewhat different from the same real-time broadcast encoded by a different content provider. By encoding content that has been decoded and rendered using a common encoding scheme, some of these variations may be reduced or eliminated, providing input to recognition components that has less variance despite being received from different content providers.

In block 935, the service provider system transfers the first generically encoded audiovisual data stream to the first subscriber to play. Transfer of the first generically encoded audiovisual data happens simultaneously with the first subscriber watching the generically encoded version of the real-time broadcast.

Referring now to FIG. 9B, in block 940, the service provider system receives a request from a second subscriber for the same real-time broadcast from a different content provider. In block 945, the service provider system determines whether the second subscriber is authorized to access the requested real-time broadcast. If not, the second subscriber is denied access in block 950.

In block 955, the service provider system requests the same real-time broadcast from the second content provider through a web agent. In block 960, the service provider system renders and decodes the second audiovisual data stream using a virtual screen session, as described herein. Simultaneously, the service provider system provides feedback to the second content provider corresponding to actions by the second subscriber, in block 965.

In block 970, the service provider system generically encodes the second audiovisual data stream, as described herein. In block 975, the service provider system multicasts the first generically encoded audiovisual data stream to the first subscriber and to the second subscriber. In some embodiments, the service provider system multicasts the second generically encoded audiovisual data stream to the first subscriber and to the second subscriber. In some embodiments, the service provider system is further configured to determine whether the first generically encoded audiovisual data stream and the second generically encoded audiovisual data stream correspond to the same real-time broadcast, examples of which are described herein, such as the method 800 described herein with reference to FIG. 8.

Additional Embodiments and Terminology

As used herein, the terms "generically encoded" or "generic encoding" may refer to any digital encoding of a digital file or digital data that is accessible to the subscribers and does not necessarily refer to any particular encoding scheme. Thus, the term generic is used in a broad sense to differentiate it from proprietary encoding schemes that limit access to media objects to customers of specific content providers.

As used herein, the term "multicast" may refer to a networking technology that allows a server or source device to send a single copy of data to multiple recipients simultaneously. This may be differentiated from unicasting that sends data to a single recipient and broadcasting that sends data to all recipients on a network. Multicasting can conserve bandwidth by simultaneously delivering a single stream of information to multiple targeted recipients. Typically, routers between the source and targeted recipients duplicate data packets and forward multiple copies wherever the path to recipients diverges. Group membership information is used to calculate the best routers at which to duplicate the packets in the data stream to optimize the use of the network. In the context of a satellite communications network, the spot beam provided by the satellite can cover a large number of recipients. In such instances, multicasting includes instructing a plurality of recipients in the spot beam to receive the data sent as part of the multicast.

As used herein, the term "fingerprint" or "fingerprinting" can refer to any suitable process of generating content-identifying information that corresponds to the content of audiovisual data. For example, a fingerprint can characterize visual data, audio data, a combination of audio and visual data, or the like. A goal of generating such information is to identify where a piece of content sent through different content providers is the same content. The disclosed fingerprinting techniques do not necessarily require the pieces of content from the different content providers be bitwise identical meaning that the disclosed content-identifying information and techniques for generating such information can be configured to determine that content from different content providers is the same content even where encoding schemes or other variables differ from one content provider to another.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system comprising:
a network interface;
a non-transitory computer-readable medium; and
a processor communicatively coupled to the communications interface and the non-transitory computer-readable medium, the non-transitory computer-readable medium comprising processor-executable instructions configured to cause the processor to:
receive a request from a first subscriber for a real-time broadcast from a first content provider;
authorize access to the real-time broadcast from the first content provider using credentials corresponding to the first subscriber;
request the real-time broadcast from the first content provider;
generically encode audiovisual data from the first content provider corresponding to the real-time broadcast to generate a first generically encoded audiovisual data stream by encoding rendered frames of the audiovisual data from video memory;

determine that a second generically encoded audiovisual data stream corresponds to the real-time broadcast requested by a second subscriber from a second content provider;

multicast the first generically encoded audiovisual data stream to the first subscriber and to the second subscriber;

after determining that the second generically encoded audiovisual data stream corresponds to the real-time broadcast, monitor correspondence between the first generically encoded audiovisual data stream and the second generically encoded audiovisual data stream; and responsive to determining a difference between the second generically encoded audiovisual data stream and the first generically encoded audiovisual data stream after determining that the second generically encoded audiovisual data stream corresponds to the real-time broadcast, transmit the first generically encoded audiovisual data stream to the first subscriber and the second generically encoded audiovisual data stream to the second subscriber until the difference between the second generically encoded audiovisual data stream and the first generically encoded audiovisual data stream disappears.

2. The system of claim 1, wherein the processor-executable instructions further cause the processor to receive a request from the second subscriber for the real-time broadcast from the second content provider.

3. The system of claim 2, wherein the processor-executable instructions further cause the processor to authorize access to the real-time broadcast from the second content provider using credentials corresponding to the second subscriber.

4. The system of claim 3, wherein the processor-executable instructions further cause the processor to request the real-time broadcast from the second content provider.

5. The system of claim 4, wherein the processor-executable instructions further cause the processor to generically encode audiovisual data from the second content provider corresponding to the real-time broadcast to generate the second generically encoded audiovisual data stream by encoding rendered frames of the audiovisual data from video memory.

6. The system of claim 5, wherein the processor-executable instructions further cause the processor to compare the first generically encoded audiovisual data stream to the second generically encoded audiovisual data stream to determine that each corresponds to the real-time broadcast.

7. The system of claim 6, wherein the processor-executable instructions further cause the processor to transmit a portion of the second generically encoded audiovisual data stream to the second subscriber responsive to determining that a portion of the second generically encoded audiovisual data stream differs from the first generically encoded audiovisual data stream.

8. The system of claim 6, wherein determining that the first generically encoded audiovisual data stream and the second generically encoded audiovisual data stream correspond to the real-time broadcast comprises comparing metadata of the first generically encoded audiovisual data stream to metadata of the second generically encoded audiovisual data stream.

9. The system of claim 6, wherein determining that the first generically encoded audiovisual data stream and the second generically encoded audiovisual data stream correspond to the real-time broadcast comprises comparing fingerprints of chunks of each generically encoded audiovisual data stream.

10. The system of claim 1, wherein the processor-executable instructions further cause the processor to initiate a virtual screen session for rendering the audiovisual data stream from the first content provider.

11. The system of claim 1, wherein the processor-executable instructions further cause the processor to send information regarding interactions of the first subscriber with a website or application of the first content provider.

12. The system of claim 11, wherein the processor-executable instructions further cause the processor to generate an interface that mimics the website or application of the first content provider, the first subscriber interacting with the generated interface.

13. A method for reducing bandwidth consumption comprising:

receiving a request from a first subscriber for a real-time broadcast from a first content provider;

authorizing access to the real-time broadcast from the first content provider using credentials corresponding to the first subscriber;

requesting the real-time broadcast from the first content provider;

generically encoding audiovisual data from the first content provider to generate a first generically encoded audiovisual data stream by encoding rendered frames of the audiovisual data from video memory;

determining that a second generically encoded audiovisual data stream corresponds to the real-time broadcast requested by a second subscriber from a second content provider; and multicasting the first generically encoded audiovisual data stream to the first subscriber and to the second subscriber;

after determining that the second generically encoded audiovisual data stream corresponds to the real-time broadcast, monitoring correspondence between the first generically encoded audiovisual data stream and the second generically encoded audiovisual data stream; and responsive to determining a difference between the second generically encoded audiovisual data stream and the first generically encoded audiovisual data stream after determining that the second generically encoded audiovisual data stream corresponds to the real-time broadcast, transmitting the first generically encoded audiovisual data stream to the first subscriber and the second generically encoded audiovisual data stream to the second subscriber until the difference between the second generically encoded audiovisual data stream and the first generically encoded audiovisual data stream disappears.

14. The method of claim 13, wherein determining that the first generically encoded audiovisual data stream and the second generically encoded audiovisual data stream correspond to the real-time broadcast comprises comparing metadata of the first generically encoded audiovisual data stream to metadata of the second generically encoded audiovisual data stream.

15. The method of claim 13, wherein determining that the first generically encoded audiovisual data stream and the second generically encoded audiovisual data stream correspond to the real-time broadcast comprises comparing fingerprints of chunks of each generically encoded audiovisual data stream.

16. The method of claim 13 further comprising initiating a virtual screen session for rendering the audiovisual data from the first content provider.

17. The method of claim 16 further comprising generically encoding audiovisual content from the second content provider to generate the second generically encoded audiovisual data stream by encoding rendered frames of the audiovisual data from video memory using a second virtual screen session.

18. The method of claim 13 further comprising sending information regarding interactions of the first subscriber with a website or application of the first content provider.

19. The method of claim 18 further comprising generating an interface that mimics the website or application of the first content provider, the first subscriber interacting with the generated interface.

20. The method of claim 13 further comprising identifying chunks of the second generically encoded audiovisual data stream that do not have a sufficiently similar fingerprint to the first generically encoded audiovisual data stream and storing the identified chunks as an advertisement in a cache.

21. The method of claim 13, wherein the audiovisual data is received from the first content provider in a first encoding and from the second content provider in a second encoding different from the first encoding.

* * * * *